United States Patent
Terase et al.

(10) Patent No.: US 6,890,643 B2
(45) Date of Patent: *May 10, 2005

(54) FLOOR POLISHING COMPOSITION

(75) Inventors: Kunihiko Terase, Kitakyushu (JP); Masaki Inoue, Kitakyushu (JP); Atsunari Fujii, Kitakyushu (JP); Eiichi Ono, Kitakyushu (JP); Takayoshi Sasaki, Kitakyushu (JP)

(73) Assignees: Asahi Glass Company, Limited, Tokyo (JP); Dohkai Chemical Industry Co., Ltd., Kitakyushu (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/939,804

(22) Filed: Aug. 28, 2001

(65) Prior Publication Data

US 2002/0065355 A1 May 30, 2002

(30) Foreign Application Priority Data

Aug. 28, 2000 (JP) ........................................ 2000-256775
Aug. 31, 2000 (JP) ........................................ 2000-262611

(51) Int. Cl.⁷ .............................. C09C 1/04; B32B 5/16
(52) U.S. Cl. ...................... 428/323; 428/324; 428/325; 428/331; 428/402; 428/403; 428/404; 428/407; 106/415; 106/454; 106/482
(58) Field of Search ................................ 428/323, 324, 428/325, 331, 402, 403, 404, 407; 106/415, 454, 482

(56) References Cited

U.S. PATENT DOCUMENTS

| | | | |
|---|---|---|---|
| 3,808,036 A | * | 4/1974 | Zdanowski ................. 427/445 |
| 3,900,438 A | | 8/1975 | Zdanowski et al. |
| 4,363,835 A | * | 12/1982 | Hackett et al. ............. 427/355 |
| 6,077,341 A | | 6/2000 | Terase et al. |
| 6,534,176 B2 | | 3/2003 | Terase et al. |

FOREIGN PATENT DOCUMENTS

EP        0 889 004        1/1999

OTHER PUBLICATIONS

U.S. Appl. No. 09/729,822, filed Dec. 6, 2000, Pending.

* cited by examiner

*Primary Examiner*—Leszek B Kiliman
(74) *Attorney, Agent, or Firm*—Oblon, Spivak, McClelland, Maier & Neustadt, P.C.

(57) ABSTRACT

A floor polishing composition containing a film-formable organic high molecular material as the main component, which further contains at least scaly particles.

17 Claims, No Drawings

FLOOR POLISHING COMPOSITION

The present invention relates to a floor polishing composition for a surface of a substrate for purposes of providing protection, antifouling property, gloss and the like on a floor surface, and also relates to a floor polishing film.

Heretofore, a floor polishing composition is widely used for forming a floor polishing film on a floor surface to provide protection, antifouling property and gloss on the floor surface, i.e. a surface of a substrate such as plastic, wood, natural stone, cement set material, metal, glass, ceramics, leather (natural or artificial ones), and the like. Recently, as the floor polishing composition, a synthetic organic high molecular material is often used in addition to natural products such as conventional wax commonly used as a polishing agent for forming a floor polishing film.

Physical properties generally required for a floor polishing composition (or a floor polishing film formed thereby (which may be referred simply to "polishing film" or "film" hereinafter)) are illustrated below.

① The film must have satisfactory mechanical strength, durability and chemical resistance to protect a floor surface.
② The film must have a high transparency (that is, the film must not conceal an original color or a design of a floor surface).
③ The film must have a high gloss for improving outer appearance.
④ Unlike a paint, the film must be easily peeled or washed since it is necessary to form a new film after peeling or washing the film from a floor surface periodically.
⑤ The floor polishing composition or the film must be safe to human body.

However, actually, it is not easy to obtain a floor polishing composition satisfying all of the above required physical properties.

Hereinafter, problems concerning a floor polishing composition used for an office building, a restaurant, a department store, a supermarket, and the like are concretely discussed in details.

A plastic tile is generally used as a floor material for forming these floors, and among them, a polyvinyl chloride tile is commonly used since it is cheap.

A floor polishing composition is generally a floor polishing composition (having a solid content concentration of about 10 to 30 mass % for example) in aqueous emulsion state, which comprises a transparent organic high molecular material such as acryl resin type, urethane resin type, styrene resin type, epoxy resin type, silicone resin type or fluorine resin type resin, and at least two kinds of copolymer resin of these resins, and is coated on a floor surface such as a newly provided plastic tile surface (or a clean tile surface obtained by applying an aqueous release agent or a neutral detergent to a film surface to renew the previously coated film by peeling and washing with a brush and drying at room temperature, as described below) with a mop a plurality of times (generally within 15 times). The floor polishing composition may be optionally referred to as "floor polishing liquid" or "polishing liquid" in the following explanation.

The polishing liquid can be coated by one time, but is usually coated a plurality of times, and by providing a coating film of laminated structure, a film excellent in antifouling property, smoothness and gloss can be obtained. Thus, the floor polishing composition is generally coated a plurality of times as described below.

That is, a coating amount for one time is about 1 to 10 g/m² in terms of a solid content calculation of an organic high molecular material, and each coating is dried at room temperature for about 1 hour to form one layer of film, and this coating/drying cycle is repeated a plurality of times.

Generally, there are many minute pores having a diameter of from a few μm to 100 μm on the surface of a plastic tile, and among the above-mentioned plural coatings, in the first 1 to 2 times coatings, the polishing liquid is penetrated into the minute pores and an organic high molecular material is filled into the minute pores. Thus, the first 1 to 2 times coatings are to fill the minute pores, and at this stage, smoothness of a film is not sufficient and gloss of the film is also insufficient.

Further, if the polishing liquid is coated thereon 3 to 15 times in the same manner as above, smoothness of the film is improved by each coating layer every time, and a finally layered structure film has a satisfactory gloss.

The floor polishing film thus overcoated a plurality of times achieves stabilization phenomenon (referred to as "curing") of the coating layer by foot pressure of passersby on the surface as a lapse of time, and therefore, the coating film generally improves its hardness as compared with the initial stage of coating.

A floor polishing film immediately after coating is a glossy beautiful film, but becomes dirty by repeated shoes pressure of many passersby and also by pressure of a heavy cart filled with daily necessaries, for example, in supermarkets. Thus, the floor polishing film is rapidly abraded, scratched and becomes dirty by heel marks and the like. Further, in a supermarket, there is a place where many carts are specially placed which is one of the most severe environment wherein the polishing film receives damages by abrasion and scratches, and in that place, the damages of the polishing film are remarkably accelerated.

When the floor polishing film is soiled, damaged and loses gloss (i.e. when the floor surface becomes dirty), its total sale place looks dirty and raises a problem of providing a bad impression and a bad feeling to customers. According to various researches, it is clear that beauty and cleanliness of a sale place provide psychologically a good impression and are important factors closely connected with increase and decrease in the amount of sales. This is now a common sense to floor managers.

Therefore, floor managers of a department store and a supermarket are responsible for carrying out the following periodical maintenance operations with regard to abraded and soiled floor polishing films to constantly remove dirty parts and to recover glossiness, thereby maintaining sale floors as clean as possible and as beautiful as possible. This is a very important operation for administration of sale floors.

① Care operation: This operation includes cleaning of a floor polishing film with a dilute aqueous solution of a neutral detergent, drying at room temperature, and mechanical polishing operation (buff-polishing (burnishing)), and this operation is carried out everyday.

Further, in addition to the above care operation, the following recovering operation and recoating operation are carried out at such a frequency as required.

② Recovering operation: The floor polishing film is cleaned with a solution containing chemicals for repairing and is dried at room temperature.

③ Recoating operation: About 1 to 2 layers (the most badly damaged and soiled layer) of the surface of a polishing film of layered structure are dissolved with a chemical solution, and the surface is washed with a dilute aqueous solution of a neutral detergent, and 1 to 2 layers of a floor polishing composition are coated thereon, and dried at room temperature, and polished.

Basically, by repeating the above maintenance operation cycle ①to ③, the quality of a coating film of floor surface is daily maintained.

However, even by carrying out these maintenance operations, soiling and damaging of the coating film more badly proceed after a lapse of 1.0 to 1.5 years, and it becomes impossible to recover by the above maintenance operations. It is therefore necessary to peel the coating film of the total surface and to freshly coat a polishing film (hereinafter referred to as "total surface repair operation") in the following manner.

④ Peeling operation: A highly alkaline chemical solution for peeling is applied on a coating film to dissolve or decompose the coating film so as to be easily peeled, and the whole coating film is then peeled from a tile surface by brushing. Further, the surface is washed with a dilute aqueous solution of a neutral detergent, and was dried at room temperature.

⑤ New coating operation: After the above peeling operation, a floor polishing composition is coated a plurality of times (within 15 times) to form a new fresh film on a floor tile surface (thereafter, this operation leads to the above maintenance operations ① to ③).

In a department store or a supermarket, it is impossible to carry out the above-mentioned recovering operation, recoating operation and total surface repair operation during business hours gathering customers, and these operations are carried out nighttime after closing the stores or early in the morning before opening the stores. These operations were very hard works including peeling of a coating film and many repetitions of coating and drying.

Under these circumstances, it is strongly demanded to improve hardness, abrasion resistance, scratch resistance and antifouling property of a floor polishing film, thereby improving various properties of the film itself and largely reducing maintenance operations of the film, and consequently to prolong the time required until the total surface repair operation of the film.

An object of the present invention is to provide a floor polishing composition largely reducing conventional maintenance operations of a floor polishing film.

The present inventors have intensively studied the importance of the above object, and have discovered that antifouling property, hardness, abrasion resistance, scratch resistance and resistance to heel marks of a floor polishing film are greatly improved, and required maintenance operations of the film are largely reduced by incorporating at least scaly particles, preferably scaly foliar silica secondary particles into a floor polishing composition comprising an organic high molecular material conventionally used. The present invention has been accomplished on the basis of this discovery.

That is, the present invention provides a floor polishing composition containing a film-formable organic high molecular material as the main component, characterized by incorporating at least scaly particles into the composition.

Also, the present invention provides a floor polishing film comprising a film-formable organic high molecular material provided on the surface of a substrate, characterized in that the film contains scaly particles.

Hereinafter, the present invention further described in more details.

(Floor Polishing Composition Comprising Film-formable Organic High Molecular Material as the Main Component)

The floor polishing composition of the present invention comprises a film-formable organic high molecular material as the main component. As the organic high molecular material, it is preferable to use a transparent organic high molecular material (a refractive index of resin is about 1.3 to 1.6) of at least one resin (homoresin type) selected from the group consisting of acryl resin type, urethane resin type, styrene resin type, epoxy resin type, silicone resin type, fluorine resin type, vinyl chloride resin type, vinyl acetate resin type and polyester resin type resins or a copolymer type resin of at least two kinds of the above resins or a mixture or a composite of at least two kinds of these homo resin type resin or copolymer type resin.

It is preferable to use these organic high molecular materials as fine particles dispersed in an aqueous emulsion (solid content concentration is for example 10 to 30 mass %, pH 8.0 to 9.5). By coating the aqueous emulsion on the surface of a substrate and drying, the dispersed organic high molecular material particles approach and coalesce to each other to form a film.

Also, in addition to an aqueous solvent, a glycol ether type solvent can be used, but an aqueous emulsion is preferable since it is easy to handle.

The organic high molecular material basically comprises the above illustrated materials, but the following resins well known as a floor-polishing composition may be used.

(1) A resin containing a component having an epoxy group-containing epoxy resin dispersed or crosslinked in an aqueous resin having a carboxyl group (such as a resin selected from an aqueous polyurethane type resin containing carboxylic acid and/or carboxylate, an acryl type resin, an acryl-soluble resin, an aqueous polyolefin type resin and an ionomer aqueous resin) (JP-A-2000-86977).

(2) A resin obtained by adding an alkali metal hydroxide and a calcium ion-releasing compound to an aqueous emulsion or an aqueous dispersion of a polymer selected from an aqueous urethane type polymer and an $\alpha$, $\beta$-unsaturated carboxylic acid type polymer having a carboxyl group in a molecular and having the carboxyl group in the polymer calcium-crosslinked (JP-A-10-102006).

(3) A resin comprising an aromatic vinyl compound and a (meth)acrylic acid ester and an $\alpha$, $\beta$-ethylenic unsaturated carboxylic acid (JP-A-9-95642).

(4) A resin having a multivalent metal compound such as Zn contained in a polymer of an ethylenic unsaturated compound in aqueous dispersion state (JP-A-8-60102).

(5) A resin containing a multivalent metal complex and one or two or more kinds of an aqueous emulsion resin having an acid value of from 4 to 150 mgKOH/g (per resin solid content) obtained by polymerizing a (meth)acryl type radical-polymerizable monomer in the presence of an aqueous polyurethane having an acid value of from 20 to 200 mgKOH/g (per resin solid content) (JP-B-8-19309).

(6) A resin obtained by emulsion-polymerizing a mixture comprising an oil/water type emulsion of organopolysiloxane and a mixture monomer of an $\alpha$, $\beta$-unsaturated carboxylic acid and acrylic and/or methacrylic acid ester monomer in the presence of a radical-polymerization initiator (Patent No. 2698447).

The floor polishing composition of the present invention is an emulsion comprising an organic high molecular material in the above-mentioned aqueous emulsion state as the main component, but may optionally contain an appropriate amount of an additive such as a crosslinking agent, a film-forming agent, a plasticizer, a coalescing agent, a surfactant, a defoaming agent, a leveling agent, a slippage-adjuster, a detergent resistance-imparting agent, a release property-improving agent, an antiseptic agent, a sterilizer, a repellent (insecticide), an antistatic agent or the like.

Examples of a crosslinking agent used for an emulsion or a dispersion of an aqueous urethane type polymer or an $\alpha$, β-unsaturated carboxylic acid type polymer having a carboxyl group or a carbonyl group in a molecule, include a compound having at least 2 hydrazine groups in a molecule, a complex or a salt of a divalent or higher multivalent metal such as zinc or aluminum, and the like. Examples of a film-forming agent include alcohols, glycol ethers, and the like. Examples of a plasticizer include adipic acid esters, dibutyl phthalate, dioctyl phthalate, 2-pyrrolidone, tributoxyethyl phosphate, octyldiphenyl phosphate, tricresyl phosphate, adipic acid esters, and the like.

On the other hand, examples of a coalescing agent include diethylene glycol monobutyl ether, diethylene glycol monoethyl ether, trimethylpentanediol•monoisobutyrene, N-methyl-2-pyrrolidone, texanol, and the like. Examples of a surfactant include an ethylene oxide adduct of polyoxyethylene nonylphenyl ether, an ethylene oxide adduct of sodium polyoxyethylene lauryl ether sulfate, a fluorine type surfactant, and the like. Examples of a leveling agent include an alkali-soluble resin, adipic acid esters, and the like. Examples of a slippage-adjuster include a natural wax such as a plant type, animal type, mineral type or petroleum type wax, or a synthetic hydrocarbon, polyethylene wax, polypropylene wax, modified wax, and the like. Examples of a repellent (insecticide) include a pyrethroid type insecticide and the like.

(Subject to be Coated with Floor Polishing Composition)

Examples of a subject to be coated with the floor polishing composition of the present invention include a surface, particularly a floor surface, of a substrate such as plastic, wood, natural or artificial stone material, cement-cured material, metal, glass, ceramics, leather (natural or artificial ones), and the like. The term "floor polish" used in the present invention means a typical use for a floor surface, but should not be limited thereto, and if necessary, the floor polishing composition of the present invention may also be applied to a wall surface, a ceiling surface, a substrate surface of steps, an outer surface of car bodies, and the like.

As mentioned above, a plastic floor material is usually used as a material for floors of an office building, a restaurant, a department store, a supermarket or the like, and particularly a polyvinyl chloride floor tile is widely used since it is cheap.

A general example of such a tile may have various sizes, a typical example of which is 304.8 mm×304.8 mm×3.2 mm (thickness), and a tile surface having high smoothness and glossiness is a front surface (upper surface), to which various kinds of beautiful pictures, designs, patterns or the like are applied. Pictures, colors and the like are selected in such a manner as to be most suitable depending on an atmosphere of a sale place and a sale floor.

However, as mentioned above, according to observation by a microscope, even an apparently beautiful and smooth tile surface generally has many minute pores having a diameter of from a few $\mu$m to 100 $\mu$m. Due to the presence of such minute pores, the first one to two layers of a polishing composition are penetrated and filled into the minute pores when the floor polishing composition is coated on the surface. The above tiles include two kinds of tiles such as a composition tile and a homogeneous tile depending on a layer structure in the direction of plate thickness, but the presence of minute pores on a plate surface is substantially the same between the two kinds of tiles, and this was confirmed by the test results made by the present inventors that the two kinds of tiles can be handled equally.

(Scaly Particles)

The floor polishing composition containing a film-formable organic high molecular material as the main component of the present invention is characterized by incorporating scaly particles therein.

The present inventors have discovered that scaly particles having a large aspect ratio which is a ratio of a face length to a thickness of particle, provide a very large covering ratio by overlaying of particles per unit filling mass and consequently that film properties are greatly improved by incorporating such particles as a filler into a film.

That is, in the process of coating the floor polishing composition on a floor surface and drying the polishing composition to form a polishing film, the scaly particles incorporated in the polishing composition are aligned by overlaying in the film in parallel to the floor surface, and consequently the particles in the film are present in a face-to-face contact state each other. Therefore, it is considered that a strength of the film is improved and that an adhesion to the substrate surface is increased.

Any particles having a scaly form can be used and are not specially limited, but preferable examples include silica, mica, talc, glass, alumina, titanium oxide, zinc oxide, tin oxide, and the like, and particularly preferable examples include silica, mica and talc.

An average particle size (measured by a Coulter counter, a laser diffraction•scattering particle size distribution measuring apparatus, a dynamic light-scattering particle size distribution measuring apparatus or the like) is not specially limited, but particles used in the present invention preferably have an average particle size of from 0.001 to 20 $\mu$m and a ratio of a face diameter to a thickness of particle (aspect ratio) of at least 2 and at most 300.

A blending amount of scaly particles in the floor polishing composition is from 1 to 80 mass %, preferably from 1 to 70 mass %, more preferably from 2 to 60 mass %. The blending amount is optionally selected depending on an environment of a floor surface to be coated with the floor polishing composition. For example, under such a severe environment as the above-mentioned cart place, the scaly particles are blended preferably in an amount of at least 30 mass %, more preferably at least 50 mass %.

Heretofore, it has been proposed to use a colloidal silica as a filler for a floor polishing composition (see JP-A-6-80933 and JP-A-8-109353 for example), but the present inventors have discovered that the colloidal silica has a minute sphere or amorphous form, which raises various problems. For example, when the colloidal silica is blended with a floor polishing composition, particularly in an amount of at least several tens %, adhesion to a substrate surface is lowered, and in an extreme case, the coated film is easily peeled off. This is because the minute sphere-like colloidal silica is contacted with each other by point-to-point in the film, and drying at room temperature does not achieve a film-forming effect and does not have a function of improving a film strength. Further, if particles having such a shape are present on a substrate surface, they prevent a film-formable organic high molecular material from contacting with a substrate surface, thereby lower an adhesion.

Also, the present inventors have discovered that a floor polishing film formed by bending colloidal silica as a main filler raises a problem of providing a poor heel mark resistance.

In the present invention, scaly particles are most preferably silica generally referred to as layered polysilicic acid or its metal salt. Here, the layered polysilicic acid is a polysilicic acid having a silicate layer structure wherein the basic units are composed solely of $SiO_4$ tetrahedron.

The layered polysilicic acid or its salt may, for example, be silica-X, silica-Y, kenyaite, magadiite, makatite, ilerite, kanemite or octosilicate, and it is a general name for a H-type having alkali metals in a silicate ion-exchanged with hydrogen ions, for example, by acid treatment of a layered polysilicate and a salt type such as an alkali metal salt before such acid treatment. In the present invention, the layered polysilicic acid means both of the above H-type and the salt type such as the alkali metal salt.

Among them, silica-X known as a kind of layer-like polysilicic acid was fully reported firstly by A. Heydemann (Beitr. Mineral. Petrogr., 10, 242–259 (1964)), and crystals similar to silica-X and silica-Y were reported by B. A. Mitsyuk (Geochem. Int. 13,101–111 (1976)), and silica-X and silica-Y were reported by S. Kitahara et al (Proc. Inst. Symp. Hydrotherm. React., 1s, 480–495t (1983)).

On the other hand, as layered polysilicic acids and their salts, natural or synthetic layered polysilicic acids or their salts are known, such as kanemite, makatite, magadiite, kenyaite, ilerite and octosilicate, as mentioned above, and there have been many research reports relating to them. For example, in Japan, as a typical and progressive theory, Katsunori Kosuge, Clay Science, 33(4), 215–222 (1994) is available, and with respect to kenyaite, K. Beneke et al., American Mineralogist, 68, 818–826, (1983), etc. are available. Further, the nomenclature relating to the layered polysilicic acid or the layered polysilicate, is described in the general discussion by Kuroda (Surface, vol. 27, No. 2, 77–88 (1989)).

Particularly, scaly fine particles used for blending with a polishing composition are most preferably the above-mentioned layer-like polysilicic acid because it has a function of improving hardness of a film, transparency, glossiness, antifouling property and adhesion to a substrate.

Layer-like polysilicic acid used in the present invention particularly preferably comprises secondary particles of foliar silica formed by overlaying a plurality of flaky primary particles of scaly silica one on another and aligning face-to-face in parallel with one another. These scaly silica particles provide most satisfactory functions of improving hardness of a film, transparency, glossiness, antifouling property and adhesion to a substrate.

The above secondary particles of foliar silica can be industrially easily obtained by a method previously proposed by the present inventors (see JP-A-2000-72432, Japanese Patent Application No. 11-351182 and Japanese Patent Application No. 2000-206264).

Hereinafter, secondary particles of foliar silica particularly suitable to be used as a filler are described in more details.

(Secondary Particles of Foliar Silica)

Silica particles used as a filler in the present invention are most preferably secondary particles of foliar silica formed by overlaying flaky primary particles of scaly silica and aligning face-to-face in parallel with one another, as mentioned above.

The primary particles can not be identified by a scanning electron microscope (hereinafter referred to simply as "SEM"), and only foliar secondary particles formed by a plurality of such scaly primary particles, which are aligned face-to-face in parallel with one another, can be identified. On the other hand, by the observation by means of a transmission electron microscope (hereinafter referred to simply as "TEM"), the primary particles which are extremely thin flaky particles through which electron rays may partially pass, can be identified. It is difficult to peel and isolate the flaky primary particles as constituting units one by one from the foliar secondary particles constituted by the primary particles which are overlaid one on another to have a layered structure firmly adhered between layers.

The secondary particles of foliar silica used in the present invention can be obtained by disintegrating tertiary agglomerated particles of silica (tertiary particles).

As can be seen from a SEM photograph showing the tertiary agglomerated particles of silica, it is clearly observed that foliar secondary particles are overlaid one on another irregularly and numerous pore spaces (voids or pockets) formed by such irregular overlaying, are present. Such agglomerated particles may take a form which may be expressed variously depending upon the state on appearance, such as a cabbage-form, an onion-form, a petal-form, a bud-form or a snail-form.

The tertiary agglomerated particles of silica can be preferably prepared by the method previously proposed by the present inventors (JP-A-2000-72432).

It is a method wherein sphere-like or amorphous silica hydrogel is used as the starting material, and the starting material is subjected to hydrothermal treatment in the presence of an alkali metal, which is a preferred method in that the tertiary agglomerated particles of silica in the present invention, such as silica-X or silica-Y, can be produced by a reaction at a lower temperature in a short period of time without formation of crystals such as quartz and yet in good yield In the case of spherical silica hydrogel, as is well known, it may be formed by solidifying silica hydrosol into a spherical shape in a petroleum or in other media. More preferably, it can be produced by a method wherein an aqueous alkali metal silicate solution having a silica/alkali molar ratio ($SiO_2/Me_2O$, Me:alkali metal) of 3.5–20 mol/mol and a silica concentration of 2–20 mass % and an aqueous mineral acid solution are mixed to form a silica sol having a pH of 7 to 9 in a short time, and the silica sol is discharged in a gas medium and gelled in the gas, as disclosed in JP-B-48-13834.

Using such silica hydrogel as the starting material, the hydrothermal treatment is carried out by heating it in a heat pressure container such as an autoclave to form the tertiary agglomerated particles of silica. In such a case, such spherical silica hydrogel may be used as it is. However, preferably, it is pulverized or roughly pulverized to have a particle size of from about 0.1 to 6 mm, so that stirring in the autoclave can more efficiently be carried out.

In order to obtain a mono phase of silica-X or silica-Y in a short time, the hydrothermal treatment is carried out within a temperature range of from 150 to 220° C., preferably from 160 to 200° C.

The time required for the hydrothermal treatment varies depending upon the temperature of the hydrothermal treatment or presence or absence of seed crystals, but usually, it is from 3 to 50 hours, preferably from 5 to 40 hours.

The tertiary agglomerated particles of silica obtained in an aqueous slurry is disintegrated and dispersed by such a specific method as previously proposed by the present inventors to obtain a slurry of the secondary particles of foliar silica having a solid content concentration of from 1 to 20 mass % (see Japanese Patent Application No. 11-351182 and Japanese Patent Application No. 2000-206264).

Thus, the tertiary agglomerated particles of silica obtained by the above described process in the form of an aqueous slurry, is then subjected to washing with water and solid/liquid separation by means of an apparatus for solid/liquid separation and an apparatus for washing with water, such as a belt filter or a filter cloth type centrifugal separator, and if necessary, further subjected to repulping with water, to obtain an aqueous slurry having a $SiO_2$ concentration of from 1 to 30 mass % and comprising the tertiary agglomerated particles of silica. The disintegration is carried out by supplying the above slurry to a wet system pulverizing apparatus (a disintegrating apparatus) such as a wet type ball mill or a wet type beads mill of a system wherein a disintegrating medium is employed for mechanical high speed stirring and subjecting the tertiary agglomerated particles of scaly silica to disintegrating treatment. At that time, it is desired that disintegration/dispersion is carried out without pulverizing or destroying the secondary particles of foliar silica as far as possible. Among the above-mentioned methods, particularly preferred is a wet system beads mill employing medium beads made of zirconia or alumina having a diameter of from 0.2 to 1.0 mm.

Thus, the secondary particles of foliar silica having an average particle size of 0.001 to 10 $\mu$m can be obtained as a slurry, wherein a plurality of flaky primary particles of scaly silica containing substantially no tertiary particles are overlaid one on another and aligned face-to-face in parallel with one another.

Now, the fundamental physical properties of the secondary particles of foliar silica of the present invention will be described below.

The $SiO_2$ purity of the silica in the secondary particles of silica, is at least 99.0 mass %. The pH is from 6.0 to 8.0. The X-ray diffraction spectrum indicates a silica comprising silica-X characterized by the main peaks at $2\theta=4.9°$, $26.0°$ and $28.3°$ corresponding to a card (hereinafter referred to simply as ASTM card) number of 16-0380 registered in ASTM (American Society for Testing and Materials) of USA, and/or silica-Y characterized by the main peaks at $2\theta=5.6°$, $25.8°$ and $28.3°$, corresponding to an ASTM card number of 31–1233. As peaks other than the above, peaks of ASTM card numbers of 31-1234 and 37-0386 are observed in the case of silica-X, and peaks of ASTM card numbers of 35-63 and 25-1332, are observed in the case of silica-Y.

The oil absorption (JIS K5101) is from 100 to 150 ml/100 g.

The secondary particles of foliar silica employed have an average particle size within the same range as in the previously mentioned other scaly particles, and the average particle size is not specially limited, but is usually from 0.001 to 20 $\mu$m, preferably from 0.01 to 10 $\mu$m, more preferably from 0.1 to 10 $\mu$m.

The average particle size is measured by a laser diffraction/scattering type particle size distribution measuring apparatus (LA-920 model, manufactured by Horiba, Ltd.), a dynamic light-scattering particle size distribution measuring apparatus (LB-500 model, manufactured by Horiba Ltd.) or a Coulter counter MA-II model, manufactured by Coulter Electronics Company), and the measuring apparatus is optionally selected depending on a particle size range.

When observing by SEM, the secondary particles of foliar silica has a thickness of from 0.001 to 0.5 $\mu$m, and a ratio of the maximum length of the secondary particles of foliar silica (plate) to a thickness (aspect ratio) is at least 5, and a ratio of the minimum length of the secondary particles of foliar silica (plate) to a thickness (aspect ratio) is at least 2. The upper limit of the ratio of the maximum length to a thickness and the upper limit of the ratio of the minimum length to a thickness of the secondary particles of foliar silica are not specified, but the former upper limit is preferably at most 300 and the latter upper limit is preferably at most 150.

When the pore distribution of the secondary particles of silica is measured by a BET method (BELSORP-28 model, tradename, manufactured by Nippon Bell Co.), the pore volume is from 0.05 to 0.15 ml/g, and the specific surface area is from 30 to 80 $m^2/g$.

As optical physical properties, the secondary particles of silica have a light refractive index of from 1.48 to 1.52.

Further, the infrared adsorption spectrum (FT-IR) of the silica ($SiO_2$ at room temperature, which is not heat-treated) indicates a silica having silanol groups having one absorption band at each of from 3,600 to 3,700 $cm^{-1}$ and from 3,400 to 3,500 $cm^{-1}$. The amount of silanol groups per specific surface area by a BET method, has a large value at a level of from 50 to 70 $\mu mol/m^2$ (a few times of silica gel).

The saturated solubility at 20° C. of the silica in an aqueous acid solution and in an aqueous alkali solution is low. Namely, the dissolved $SiO_2$ concentration is 0.008 mass % in an aqueous solution containing 10 mass % of HCl, 0.006 mass % in deionized water, 0.55 mass % in an aqueous solution containing 5 mass % of NaOH and 0.79 mass % in an aqueous solution containing 10 mass % of NaOH, thus indicating that the secondary particles of silica have a small solubility in an acid or an alkali and thus have acid resistance and alkali resistance. Especially, as compared with silica gel or colloidal silica, they have a very small solubility in an aqueous alkali solution, thus indicating that they have good alkali resistance.

As mentioned above, a layer-like polysilicic acid such as the secondary particles of foliar silica used as a filler for a floor polishing composition in the present invention is preferably obtained by disintegrating the tertiary agglomerate particles of silica (tertiary particles) by a specific mechanical method discovered by the present inventors.

Whereas, heretofore, it has been proposed to chemically disintegrate and disperse such tertiary agglomerated particles by treatment with an aqueous solution of an alkali such as lithium hydroxide, potassium hydroxide or ammonium hydroxide (e.g., Kosuge Katsunori et al., Journal of the Ceramic Society of Japan, 100 (6), 872–875 (1992), Kosuge Katsunori et al., Zeolite 13 (3), 89–96 (1996), JP-A-6-104565) (hereinafter referred to as a "Chemical disintegrating method").

On the other hand, the present inventors have studied the above-mentioned chemical disintegrating method in detail in accordance with the method disclosed in the above publication using sodium-type kenyaite or the like as an example. As a result, they have confirmed that by such chemical disintegration method, particles of a form corresponding to the secondary particles of foliar silica to be used in the present invention, can not be obtained. Namely, when the particles after treatment by the chemical disintegrating method are observed by SEM, on appearance, the particles look like disintegrated, but when the particle size distributions before and after the dispersing treatment are measured by a particle size distribution measuring apparatus (such as a Coulter counter, a laser diffraction/scattering type particle size distribution measuring apparatus or a dynamic light scattering type particle size distribution measuring apparatus), no substantial change is observed in the particle size distribution as between before and after the above treatment, and no substantial decrease in the average particle size which should be observed due to the particle dispersion, has not been confirmed. Further, the particles thus obtained by the chemical disintegrating method do not have a function to form a strong coating film.

On the other hand, according to the mechanical disintegrating and dispersion method proposed by the present inventors, an average particle size after the disintegrating treatment is recognized to be largely reduced as compared with that of before the treatment without substantially destroying the basic particle shape of secondary particles of foliar silica, and according to observation of dispersed particles by SEM, it is clear that secondary particles of foliar silica are present discretely each other (see Japanese Patent Application No. 11-351182 and Japanese Patent Application No. 2000-206264). Also, the secondary particles of foliar silica itself have a film-forming property, and is characterized by forming a firm film under drying conditions at room temperature without having a binder.

As mentioned above, the secondary particles of foliar silica is prepared by disintegrating an aqueous slurry of layer-like polysilicic acid or layer-like polysilicate salt by means of a mechanical high speed stirring system employing a disintegrating medium, i.e. a system of using a wet type pulverizing apparatus (disintegrating apparatus) such as a wet type beads mill, a wet type ball mill or the like which is the most suitable dispersing method of constituent particles of tertiary agglomerate particles employed in the present invention.

(Method for Preparing a Floor Polishing Composition of the Present Invention)

Scaly particles of the above-mentioned secondary particles of foliar silica (hereinafter referred to as "foliar silica secondary particles") are preferably in an aqueous slurry since the aqueous slurry is easy to handle when it is used for blending with a polishing composition. When the aqueous slurry of foliar silica secondary particles is used for a polishing liquid, a solid content concentration of the foliar silica secondary particles in the aqueous slurry is preferably from 5 to 20 mass %.

Also, particularly when using the aqueous slurry of the foliar silica secondary particles for mixing with a polishing liquid comprising an organic high molecular material in aqueous emulsion state, it is necessary to pretreating the aqueous slurry of foliar silica secondary particles. A polishing liquid is generally an alkaline aqueous emulsion state of pH 8.0 to 9.5. Since the stability of the aqueous emulsion depends on pH, it is preferable to mix the two solutions after adjusting the pH value of the polishing liquid and the pH value of the aqueous slurry of foliar silica secondary particles so as to be substantially equivalent to each other in such a manner as not to destroy the emulsion state of the polishing liquid as a result of the change in the H value caused by mixing with the aqueous slurry of foliar silica secondary particles. The pH adjustment of the aqueous slurry of foliar silica secondary particles can be made by using an alkali such as a NaOH aqueous solution. The pH adjustment operation can be made before or after the mechanical disintegration using a wet type beads mill.

Further, it is also possible to use a general layer-like polysilicic acid as a filler. In such a case, an aqueous slurry of salt type such as an alkali metal salt has a high pH value, and therefore the above-mentioned problem is raised. However, an aqueous slurry of H type is basically almost neutral, and therefore it is quite easy to adjust the pH value of a polishing liquid within such a pH range as to form a stable aqueous emulsion state. In this case, an aqueous slurry having a silica concentration of from 1 to 30 mass % should preferably be a pH of from 4.0 to 9.5, more preferably from 6.0 to 9.5.

A method for preparing a polishing composition is usually carried out in the following manner. That is, a solid content concentration and a pH value of a polishing liquid comprising an organic high molecular material in aqueous emulsion state conventionally used as a polishing liquid are previously measured. Thereafter, a pH value of an aqueous slurry of foliar silica secondary particles is adjusted so as to be substantially equivalent to a pH value of a polishing liquid comprising an organic high molecular material in aqueous emulsion state to be blended, and a pH value and a solid content concentration are measured. Finally, the polishing liquid and the aqueous slurry of foliar silica secondary particles are mixed. A pH value of the polishing composition containing the foliar silica secondary particles thus obtained is adjusted so as to be a pH value of from 8.0 to 9.5 which is equivalent to that of a polishing liquid generally used.

In the present invention, a method for preparing a polishing composition is not special, and the above two liquids are charged and mixed at a predetermined ratio in a container for mixing at room temperature. The mixing apparatus is not specially limited, and a stirring apparatus having a stirring vane, a wet type dispersing machine using dispersing beads or the like can be suitably used.

After mixing the two liquids in the above-mentioned manner, it is preferable to measure a solid content concentration and a pH value in the liquid for confirmation, and if the liquid is foamed, stirring is stopped to stand still until the foam disappears, and is then used as a polishing composition.

(Polishing Composition and Composition Ratio in Polishing Film)

The floor polishing composition of the present invention comprises an organic high molecular material in aqueous emulsion state, foliar silica secondary particles and a low volatile liquid (water or an organic solvent). Water is preferable as the low volatile liquid in view of easy handling. The total solid content concentration (organic high molecular material+foliar silica secondary particles) in the composition is preferably from 5 to 30 mass %, more preferably from 10 to 25 mass %. If the total solid content concentration is less than 5 mass %, a drying time after coating becomes too long, and if the total solid content concentration exceeds 30 mass %, a viscosity of the composition increases and it becomes difficult to uniformly coat.

In the present invention, foliar silica secondary particles are most preferable to be used as a filler, but when using foliar silica secondary particles, other scaly particles such as other layer-like polysilicic acid, mica, talc and the like may be used to be mixed therewith. Further, colloidal silica can also be used if its amount is at most 30 mass % to the total filler amount comprising scaly particles.

Also, foliar silica secondary particles provide a tough film having an excellent antifouling property, and are used in a ratio of from 1 to 90 mass %, preferably from 2 to 80 mass %, to the total solid content (organic high molecular material+foliar silica secondary particles) in the composition. If the ratio of the foliar silica secondary particles is less than 1 mass %, the above-mentioned effects achieved by the addition of the foliar silica secondary particles is substantially small, and if the ratio exceeds 90 mass %, a film becomes so opaque that a color and a design of a base tile becomes hardly visible and also that a flexibility of the film is largely lowered.

When the surface of a coating film containing foliar silica secondary particles in the above preferable range is subjected to ashing treatment by low temperature oxygen plasma to remove an organic high molecular material by ashing and then to observe the state of the foliar silica secondary particles by SEM, it can be clearly observed that the foliar silica secondary particles are aligned substantially in parallel to the tile face and are overlaid and coated on the tile surface in a layered structure.

The floor polishing film of the present invention contains scaly particles such as layer-like polysilicic acid, and particularly contains foliar silica secondary particles of flakes of scaly silica. Therefore, the film of the present invention has characteristics of being endurable to a continuous foot pressure by shoes of many passersby and being hardly damaged and being hardly soiled as compared with a conventional polishing film. This is because such foliar silica secondary particles are overlaid so as to prevent soil from invading into the film and to effectively seal soils.

(Method for Coating Polishing Composition and Method for Drying)

The polishing composition containing foliar silica secondary particles of the present invention can be coated on a plastic tile surface not by a special method but by a usual coating method of using a mop for a polishing liquid by hand, and can be dried not by a special method but by a usual drying method at room temperature.

In a laboratory, the polishing composition is coated on a small plastic tile test piece by a bar coater or a brush, and is dried at room temperature.

In the present invention, a coating method is carried out preferably by repeatedly coating the polishing composition a plurality of times (usually within 15 times) by a mop for coating a polishing liquid in accordance with a usual method.

A coating amount by one time is from 1 to 10 $g/m^2$ as a solid content (organic high molecular material+foliar silica secondary particles), and the coating is dried at room temperature to form a film. In the same manner as above, a coating film is formed on the dried film and dried. This operation is repeated a few times. Coating times are not specially limited, but are generally within 15 times as mentioned above.

The film of the polishing composition comprising an organic high molecular material and foliar silica secondary particles becomes harder (judging by pensile hardness test in a paint test method in accordance with JIS K5400) and provides a higher adhesion to a substrate (judging by cross-cut peel test in a paint test method in accordance with JIS K5400) when a ratio of the foliar silica secondary particles as a filler becomes higher to the total solid content (organic high molecular material+foliar silica secondary particles). Thus, it is preferable to use the foliar silica secondary particles at a high ratio. However, if the ratio of the foliar silica secondary particles becomes too high, transparency and glossiness of the film tend to be lowered, and a problem of damaging an outer appearance is raised. The above problem can be solved quite effectively by the following method proposed by the present inventors.

The first method comprises forming an overcoating film on a floor polishing film containing an organic high molecular material and foliar silica secondary particles formed by coating and drying a plurality of times in order to raise transparency and glossiness of the film to a desired level, the overcoating film being formed by coating a liquid containing an organic high molecular material in aqueous emulsion state which is the same or different from the organic high molecular material contained in the floor polishing film. That is, by forming the overcoating layer as mentioned above, the transparency and the glossiness of the film are largely improved (see Japanese Patent Application No. 2000-139659).

Thus, by providing a transparent overcoating layer substantially comprising an organic high molecular material on a floor polishing film containing scaly silica, the floor polishing film becomes a film having an improved transparency. The overcoating layer may further contain a crosslinking agent, a plasticizer, a surfactant, a defoaming agent, a leveling agent or the like in such an amount as not to impair the transparency of the film, for example, in an amount of less than 5 mass %.

The second method is to provide a polishing composition prepared by blending an aqueous slurry containing foliar silica secondary particles having an average particle size lessened to less than 1 $\mu$m with an organic high molecular material in aqueous emulsion state. In this case, the floor polishing film comprising an organic high molecular material and the foliar silica secondary particles formed by coating and drying is a film having a high transparency and a high glossiness without such an overcoating layer of an organic high molecular material in aqueous emulsion state as in the above first method (see Japanese Patent Application No. 2000-206264).

Mechanism for largely improving the transparency and the glossiness of the floor polishing film by these two methods is not clear, but it is considered that the transparency is largely improved and the film having a satisfactory glossiness can be obtained by two actions of an effect of reducing the volume of pores in the film comprising foliar silica secondary particles and a transparent organic high molecular material and/or an effect of reducing light scattering by decreasing concavo-convex portions on the film surface.

(Time Required for Stabilizing Polishing Film After Coating)

In case of a film formed by coating a conventional polishing liquid (i.e. a polishing liquid comprising an aqueous emulsion of an organic high molecular material without containing scaly particles) a plurality of times on a tile made of polyvinyl chloride resin or the like widely used as a floor tile, antifouling properties such as heel mark resistance (an index of fouling resistance when pressed by shoes) are not sufficient at an initial stage, and it takes about 10 days until antifouling properties such as heel mark resistance are improved and stabilized as a lapse of time (referred to as "curing time"). Therefore, during this term, heel marks are easily made, and it is quite hard to favorably maintain a film on a floor surface and it is necessary to carefully maintain the film.

On the other hand, in a polishing composition of the present invention having foliar silica secondary particles blended therein, the foliar silica secondary particles are aligned in the film in parallel to a floor surface and are present as a layer structure filler, thereby forming a tough film. Therefore, it is substantially unnecessary to wait until a coating layer is stabilized, and a stabilized film can be obtained immediately after coating and drying. Thus, the present invention is characterized in that the maintenance of a coating film is easy from the initial stage.

(With Regard to Physical Properties of the Polishing Film of the Present Invention, an Effect of Preventing Permeation of the Polishing Composition into a Base Tile and an Effect of Sealing)

As mentioned above, the surface of such a polyvinyl chloride resin tile as widely used for a floor tile is porous, and it is general that there are many fine pores. When a conventional polishing liquid comprising an aqueous emulsion of an organic high molecular material only is coated on the surface of a tile, the aqueous emulsion is permeated into the inside of a tile from the tile surface. According to the present inventors' observation of the cross section of the tile by SEM, the permeation thickness was generally about several tens $\mu$m. The polishing liquid invaded and soaked into the tile inside does not achieve the inherent function of the polishing liquid and becomes useless and raises a problem of reducing the surface smoothness of a coating layer close to that of the tile surface.

On the other hand, in the polishing composition containing foliar silica secondary particles of the present invention, the permeation of the polishing composition into the tile inside is substantially reduced, which was impossible for the conventional polishing liquid. As compared with the conventional polishing film containing no foliar silica secondary particles, the film containing foliar silica secondary particles of the present invention has the foliar silica secondary particles aligned and overlaid on a floor surface, and the film containing the particles formed between the film and the tile surface having many fine concavo-convex portions greatly improves adhesion and coating properties on the fine concavo-convex surface. Consequently, the permeation of the polishing composition of the present invention into the tile inside can be largely reduced. Thus, it was confirmed by observation of a rupture cross section and a coating surface by SEM that the permeation of the coated polishing composition of the present invention into the tile inside was reduced and that the coating layer close to the tile surface had a satisfactory surface smoothness. Also, according to the observation of the cut cross section of the polishing film formed on a base plate by SEM, the film containing foliar silica secondary particles formed on the tile surface as a base plate is hardly distinguishable from the base layer, unlike the conventional film, as proved by the following Examples. That is, the polishing film is completely integrated and homogenized with the base tile in such a manner that the boundary between the resin compound forming the tile and the resin compound forming the polishing film is hardly distinguishable. If the content of foliar silica secondary particles becomes higher, the integration degree tends to be higher. In this manner, since the floor polishing film of the present invention having foliar silica secondary particles blended therein provides a tough film integrated with the base plate, such properties as abrasion resistance, scratch resistance, heel mark resistance and the like are greatly improved.

In cases of a film containing colloidal silica as a filler and a film containing no filler, as illustrated in the following Comparative Examples, it is usually observed by SEM that a film heterogeneous to a tile base plate is formed and the film and the base plate layer are clearly distinguishable. Thus, the film properties of the conventional films are clearly different from those of the floor polishing film of the present invention. Consequently, as a matter of fact, it is expected that the conventional films are poor in adhesion to a base plate and provide a low abrasion resistance.

Also, in a case of using a conventional floor polishing composition containing no scaly silica of the present invention, when coating the composition a plurality of times, a sufficiently long drying time is required. Otherwise, a satisfactory coating finish can not be obtained and the coating operation often fails when the next layer is coated while the previously coated surface remains still sticky.

On the other hand, the floor polishing composition containing scaly silica of the present invention is characterized in that the coated surface is dried in a short time and does not remain sticky under the same conditions as above.

Therefore, even when a sufficient drying time can not be taken and next layer coatings must be made repeatedly in a short time in view of the total operation time, the floor polishing composition of the present invention provides a satisfactory coating finish without failing.

This is a great advantage in such a coating place where the total coating operation time is restricted.

Further, when a base concrete surface of a floor tile is wet, a coated portion on a small gap part between a tile and a tile often discolors due to moisture and fouling from the base concrete in a case of a conventional polishing composition, but even in such a case, in the case of the polishing composition of the present invention, foliar silica secondary particles blended in the composition satisfactorily achieve a sealing effect to the small gap part between the tiles and also achieve an effect of preventing discoloration of the coated film on the small gap part between the tiles.

EXAMPLES

Now, the present invention will be described in further detail with reference to Examples. However, it should be understood that the present invention is by no means restricted to such specific Examples.

(Evaluation Method of Antifouling Property and Scratch Resistance of Floor Polishing Film)

As a general evaluation method for a floor polishing film, a floor polishing test method defined in JIS K3920 was employed as a basic property test method.

In the present invention, not only the above basic property test method but also an evaluation test under conditions close to practical environments was carried out. That is, a field test was carried out by coating a polishing composition and drying to cure the composition on a polyvinyl chloride tile in a practical supermarket and then having supermarket customers and carts frequently passed on the coated film. During the test, a daily care operation (an operation of washing the coated film surface with a dilute aqueous solution of a neutral detergent and drying at room temperature) among the above maintenance operations was carried out after closing the store, and the floor surface was visually observed and its glossiness was measured by a gloss meter after a lapse of 3 months to evaluate antifouling property and scratch resistance of the coated film.

Also, in order to make comparison, a comparative test was carried out by using a conventional polishing liquid comprising an organic high molecular material only in aqueous emulsion state without containing foliar silica secondary particles by carrying out a daily care operation under the same maintenance operation conditions as above.

First, foliar silica secondary particles to be blended in a polishing composition were prepared in the following Synthesis Examples 1 to 5.

Synthesis Example 1

Preparation of Tertiary Agglomerated Particles of Silica Using Hydrogel as the Starting Material The starting material silica hydrogel was prepared using sodium silicate as an alkali source, as follows. 2,000 ml/min of an aqueous sodium silicate solution having a $SiO_2$ concentration of 21.0 mass % with $SiO_2/Na_2O=3.0$ (molar ratio) and an aqueous sulfuric acid solution having a sulfuric acid concentration of 20.0 mass %, were introduced from separate inlets into a container equipped with a discharge outlet and instantaneously uniformly mixed. The flow rate ratio of the two liquids was adjusted so that the pH of the liquid to be discharged into air from the discharge outlet, would be from 7.5 to 8.0, and the uniformly mixed silica sol liquid was continuously discharged into air from the discharge outlet. The discharged liquid became spherical liquid droplets in air, which were gelled in air while flying in air for about one second along a parabolic orbit. At the falling point, an aging tank containing water was placed, and the gelled particles were permitted to fall thereinto and aged.

After the aging, the pH was adjusted to 6, followed by sufficient washing with water to obtain silica hydrogel. The obtained silica hydrogel particles had a spherical particle shape and had an average particle size of 6 mm. The mass ratio of water to the $SiO_2$ mass in this silica hydrogel particles was 4.55 times, and sodium remaining in the silica hydrogel particles was 110 ppm.

The above silica hydrogel particles were roughly pulverized by means of a double roll crusher to an average particle size of 2.5 mm and used in the next step for hydrothermal treatment.

Into an autoclave (electrical heating system, equipped with anchor type stirring vanes) having a capacity of 50,000 ml, 23.7 kg of the above silica hydrogel ($SiO_2$: 18 mass %) having a particle size of 2.5 mm and 5.5 kg of an aqueous sodium silicate solution ($SiO_2$: 28.75 mass %, $Na_2O$: 9.3 mass %, $SiO_2/Na_2O=3.17$ (mol ratio)) were charged so that the total $SiO_2/Na_2O$ mol ratio in the system would be 12.0, and 10.7 kg of deionized water was added thereto, and hydrothermal treatment was carried out at 185° C. for 8 hours with stirring at a rotational speed of 50 rpm. The total silica concentration in the system was 15 mass % as $SiO_2$.

The slurry after the hydrothermal treatment was subjected to filtration and washing with water by means of a filter cloth type vertical centrifugal separator (TU-18 model, manufactured by Toko Kikai K.K.), to obtain a wet cake of silica having a water content of 69.7 mass % (solid content concentration: 30.3 mass %).

Water was added to the above wet cake, followed by repulping to obtain a slurry of silica having a $SiO_2$ concentration of 7.0 mass %. The pH of this slurry was 6.4. The sodium concentration in the silica slurry was 50 ppm. Then, this slurry was dried at a hot air temperature of 300° C. by means of a medium fluidized bed drier (SFD-MINI model, manufactured by Ogawara Seisakusho K.K.) to obtain 5.6 kg of a dried fine powder.

By a powder X-ray diffraction spectrum, identification of the formed phases was carried out with respect to the formed fine powder, whereby in the X-ray diffraction spectrum, in addition to the main peaks of silica-X corresponding to ASTM card number 16–0380 which is characterized by the main peaks at $2\theta=4.9°$ and 26.0°, peaks corresponding to ASTM card numbers 31-1234 and 37-0386 were observed.

Further, the oil adsorption (JIS K5101) of this fine powder was measured and found to be 110 ml/100 g.

The form of the formed particles was observed by TEM, whereby it was observed that secondary particles of foliar silica were formed by a plurality of scaly thin primary particles which are overlaid one on another and aligned face-to-face in parallel with one another.

On the other hand, the form of the formed particles was observed by SEM, whereby the above primary particles were not identified, and the above secondary particles of foliar silica were observed as if they were primary particles. It was observed that the shape of the foliar particles was scaly, and such scaly particles were overlaid one on another irregularly to form tertiary agglomerated particles of silica having numerous pore spaces (voids or pockets). This is the tertiary agglomerated particles of silica in the present invention.

The average particle size of this fine powder (the tertiary agglomerated particles of silica) was measured by means of a Coulter counter (MAII model, manufactured by Coulter Electronics Company, apertures tube diameter: 50 μm (the same applies in the following Synthesis Examples 2 to 4)), whereby it was found to be 6.1 μm.

Synthesis Example 2
Preparation of Tertiary Agglomerated Particles of Silica Using Hydrogel as the Starting Material The starting material silica hydrogel was prepared using NaOH as an alkali source, as follows. 2,000 ml/min of an aqueous sodium silicate solution having a $SiO_2$ concentration of 21.0 mass % with $SiO_2/Na_2O=3.0$ (mol ratio) and an aqueous sulfuric acid solution having a sulfuric acid concentration of 20.0 mass %, were introduced from separate inlets into a container provided with a discharge outlet and instantaneously uniformly mixed. The flow rate ratio of the two liquid was adjusted so that the pH of the liquid discharged into air from the discharge outlet would be 7.5 to 8.0, and the uniformly mixed silica sol liquid was continuously discharged into air from the discharge outlet. The discharged liquid became spherical liquid droplets in air, which were gelled in air while flying in air for about one second along a parabolic orbit. At a falling point, an aging tank containing water was placed, and the gelled particles were permitted to fall thereinto and aged.

After the aging, the pH was adjusted to 6, followed by sufficient washing with water to obtain silica hydrogel. The obtained silica hydrogel particles had a spherical particle shape and had an average particle size of 6 mm. The mass ratio of water to the $SiO_2$ mass in the silica hydrogel particles was 4.38 times, and sodium remaining in the silica hydrogel particles was 112 ppm.

The above silica gel hydrogel particles were roughly pulverized to an average particle size of 2.5 mm and used in the next step for hydrothermal treatment.

Into an autoclave (electrical heating system, equipped with anchor type stirring vanes) having a capacity of 5,000 ml, 2,688 g of the above silica hydrogel ($SiO_2$: 18.6 mass %) having a particle size of 2.5 mm and 126 g of an aqueous sodium hydroxide solution (NaOH: 48.5 mass %) were charged so that the total $SiO_2/Na_2O$ mol ratio in the system would be 11.0, then, 1,186 g of deionized water was added thereto, 0.5 g of seed crystals were added, and hydrothermal treatment was carried out at 180° C. for 12 hours with stirring at a rotational speed of 20 rpm. The total silica concentration in the system was 12.5 mass % as $SiO_2$.

The slurry after the hydrothermal treatment was subjected to filtration and washing with water by means of a filter cloth type vertical centrifugal separator (TU-18 model, manufactured by Toko Kikai K.K.), to obtain a wet cake of silica having a water content of 66.7 mass % (solid content concentration: 33.3 mass %).

Then, water was added to the above wet cake, followed by repulping to obtain a slurry of silica having a $SiO_2$ concentration of 7.0 mass %. The pH of this slurry was 6.4, and the sodium concentration in the silica slurry was 80 ppm. Then, this slurry was dried at a hot air temperature of 300° C. by means of a medium fluidized bed drier (SFD-MINI model, manufactured by Ogawara Seisakusho K.K.) to obtain 408 g of a dried fine powder.

With respect to the formed fine powder, by a powder X-ray diffraction spectrum, identification of formed phases was carried out, whereby in addition to the main peaks of silica-Y characterized by the main peaks $2\theta=5.6°$ and 25.8° corresponding to ASTM card number 31-1233, peaks corresponding to ASTM card numbers 35-63 and 25-1332, were observed.

Further, the oil adsorption (JIS K5101) of this fine powder was measured and found to be 100 ml/100 g.

The form of the formed particles was observed by TEM, whereby it was observed that secondary particles of foliar silica were formed by a plurality of scaly thin primary particles which are overlaid one on another and aligned face-to-face in parallel with one another.

On the other hand, the form of the formed particles was observed by SEM, whereby the above primary particles were not identified, and the above secondary particles of foliar silica were observed as if they were primary particles. It was observed that the shape of the foliar particles was scaly, and such scaly particles were overlaid irregularly to form tertiary agglomerated particles of silica in the present invention having numerous pore spaces (voids or pockets).

Further, the average particle size of this fine powder was measured by means of a Coulter counter (MAII model, manufactured by Coulter Electronics Company), and was found to be 6.5 μm.

Synthesis Example 3
Preparation of the Secondary Particles of Foliar Silica of the Present Invention in a Slurry Form From the Wet Cake of Synthesis Example 1

1,020 g of water was added to 1,000 g of the wet cake (solid content concentration: 30.3 mass %) after filtration and washing with water by the centrifugal separator shown in Example 1, followed by repulping to obtain a silica slurry having a solid content of 15 mass %. In this slurry form, the average particle size by a Coulter counter was 7.2 μm, and the viscosity by a B-type viscometer was 0.010 Pa·s. The pH of this slurry was 6.4.

The pH of this slurry was adjusted to 8.5 by adding a minor amount of sodium hydroxide aqueous solution in such a manner as to be equivalent to the pH value of a polishing composition comprising an organic high molecular material in aqueous emulsion state. Then, this slurry was passed once through a medium stirring beads mill (Dyno mill KDL-PILOT A model, manufactured by Shinmaru Enterprises Co. (vessel capacity: 1.4 l filled 80% with zirconia beads having a diameter of 0.5 mm)) at a shaft rotational speed of 3,400 rpm at a flow rate of 30 l/hr to carry out disintegration and dispersion of the tertiary agglomerated particles of silica.

The average particle size by a Coulter counter of the fine particles in the slurry after disintegration and dispersion, was 1.6 μm. This slurry had a solid content concentration of 15 mass %. Further, the viscosity of this slurry was measured by a B-type viscometer and was found to be 0.45 Pa·s. The pH of this slurry was 8.5. This slurry was used in the following Example 3.

Then, in order to examine the physical properties of the secondary particles of foliar silica dried close to the state of fine particles, of the fine particles in the slurry, a dried powder was obtained by the following method.

Such a slurry has a specific nature such that it is very likely to be agglomerated by drying, and therefore, in order to obtain a monodispersed dry powder, it is necessary to make an aqueous slurry having an extremely low concentration and to dry it while preventing agglomeration.

Water was added to the slurry (solid content concentration: 15 mass %) to adjust the slurry concentration to a solid content concentration of 0.3 mass %.

This slurry was spray-dried by means of a small size spray drier (GA32 model, manufactured by Yamato Kagaku K.K.) with a slurry supplying rate of 1.7 ml/min under a spray pressure of 0.3 MPa (G) at a hot air temperature of 130° C., to obtain a dried fine powder.

The average particle size by a Coulter counter of the obtained dried fine powder was 1.9 μm.

This fine powder was observed by SEM, whereby tertiary agglomerated particles of silica were not substantially observed, and this fine powder was found to consist essentially of the secondary particles of foliar silica of the present invention, which were present discretely each other. According to observation by SEM, this secondary particles had an average aspect ratio of about 50.

With respect to this fine powder, by a powder X-ray diffraction spectrum, identification of formed phases was carried out, whereby in addition of the main peaks of silica-X characterized by the main peaks at 2θ=4.9° and 26.0° corresponding to ASTM card number 16-0380, peaks corresponding to ASTM card numbers 31-1234 and 37-0386 were observed, which were confirmed to be the same as those in the state before disintegration.

The form of the formed particles was observed by TEM, whereby it was observed that the secondary particles of foliar silica of the present invention were formed by a plurality of scaly thin primary particles which were overlaid one on another and aligned face-to-face in parallel with one another, and which were present discretely each other.

Further, this fine powder was embedded in an epoxy resin, and an ultra thin cut specimen was prepared by an ultra microtome and observed by TEM, whereby the thickness of primary particles was found to be extremely thin at a level of from 1 to 10 nm.

As measured by a BET pore distribution measuring apparatus (BELSORP-28 model, manufactured by Nippon Bell Co.), the pore volume of the fine powder was 0.12 mL/g, the specific surface area was 65 $m^2/g$, and in the pore distribution curve, a sharp large peak of a mesopore region was observed in the vicinity of 3.6 nm.

Further, in the measurement of the infrared adsorption spectrum (FT-IR510 model, manufactured by Nikorey Japan K.K.) of the fine powder, silanol groups having an adsorption band at each of from 3,600 to 3,700 $cm^{-1}$ and from 3,400 to 3,500 $cm^{-1}$, were observed.

Further, the amount of silanol groups (SIOH) was obtained from the calculation formula of silanol groups (SiOH) per silica unit mass=W×1111.1 (μmol/g) from the difference (W mass %) between the weight reduction by drying at 120° C. for two hours and the weight reduction by heating at 1,200° C. for 3 hours, and found to be 3,650 μmol/g, and it showed a large value of 56.2 $μmol/m^2$ per specific surface area by the BET method.

With respect to the heat resistance, no particular change was observed at a temperature of from 500 to 1,000° C. in an air atmosphere, by the observation by SEM.

With respect to the saturated solubility at 20° C. in an aqueous acid solution and an aqueous alkali solution, the dissolved $SiO_2$ concentration was 0.008 mass % in a 10 mass % HCl aqueous solution, 0.006 mass % in deionized water, 0.55 mass % in a 5% NaOH aqueous solution, and 0.79 mass % in a 10 mass % NaOH aqueous solution. Especially with respect to alkali resistance, for example, as compared with silica gel, it showed a very low solubility (in the case of silica gel, the solubility is 6.5 mass % even in 3 mass % NaOH aqueous solution).

Synthesis Example 4
Preparation of the Secondary Particles of Foliar Silica of the Present Invention in a Slurry Form From the Wet Cake of Synthesis Example 2

A slurry of the wet cake after filtration and washing with water by the centrifugal separator shown in Synthesis Example 2 was passed one time through a medium stirring beads mill (Dyno mill KDL-PILOT A model, manufactured by Shinmaru Enterprises Company (vessel capacity: 1.4 l, filled 80% with zirconia beads having a diameter of 0.5 mm)) at a shaft rotational speed of 3,400 rpm at a flow rate of 30 l/hr in the same manner as in Synthetic Example 3, to carry out disintegration and dispersion of the tertiary agglomerated particles of silica thereby to obtain an aqueous slurry of secondary particles of foliar silica having a solid content concentration of 15 mass %. The pH of this slurry was 6.4.

The pH of this slurry was adjusted to 8.5 by adding a minor amount of sodium hydroxide aqueous solution in such a manner as to be equivalent to the pH value of a polishing composition comprising an organic high molecular material in aqueous emulsion state. The average particle size by a Coulter counter of the fine particles in the slurry was 1.7 μm. The solid content concentration in this slurry was 15 mass %. The viscosity was measured by a B-type viscometer and was found to be 0.40 Pa·s. This slurry, the pH of which was adjusted to 8.5, was used in the following Example 4.

Synthesis Example 5
Preparation of the Secondary Particles of Foliar Silica in an Aqueous Slurry Form From the Wet Cake of Synthesis Example 1

Water was added to the wet cake after filtration and washing with water by the centrifugal separator shown in Synthesis Example 1, to obtain a water slurry of tertiary agglomerated silica particles having a solid content of 14 mass %. This water slurry was passed three times through a medium stirring beads mill (Dyno mill KDL-PILOT A model, manufactured by Shinmaru Enterprises Co. (vessel capacity: 1.4 l, filled 70% with zirconia beads having a diameter of 0.5 mm)) at a shaft rotational speed of 3,400 rpm at a flow rate of 10 l/hr, to carry out disintegration and dispersion of the tertiary agglomerated particles of silica thereby to obtain an aqueous slurry of secondary particles of foliar silica having a solid content concentration of 14 mass %. The pH of this slurry was 6.4.

The pH of this slurry was adjusted to 8.5 by adding a minor amount of sodium hydroxide aqueous solution in such a manner as to be equivalent to the pH value of a polishing composition comprising an organic high molecular material in aqueous emulsion state. The average particle size of the fine particles in the slurry after disintegration and dispersion was 0.54 μm as measured by a laser diffraction/scattering type particle size distribution measuring apparatus (LA-920 model, manufactured by Horiba Seisakusho). The viscosity was measured by a B-type viscometer and was found to be 0.15 Pa·s. This slurry, the pH of which was adjusted to 8.5, was used in the following Examples 1, 2, 5 and 6. Then, in order to examine the physical properties of the secondary particles of foliar silica dried close to the state of fine particles, of the fine particles in the slurry, a dried powder was obtained by the following method. The average particle size of the dried fine powder measured by a laser diffraction/scattering type particle size distribution measuring apparatus was 0.8 μm.

As mentioned above, such a slurry has a specific nature such that it is very likely to be agglomerated by drying, and therefore, in order to obtain a monodispersed dry powder, it is necessary to make an aqueous slurry having an extremely low concentration and to dry it while preventing agglomeration.

Water was added to the slurry (solid content concentration: 14 mass %) to adjust the slurry concentration to a solid content concentration of 0.1 mass %.

This slurry was spray-dried by means of a small size spray drier (GA32 model, manufactured by Yamato Kagaku K.K.) with a slurry supplying rate of 1.7 ml/min under a spray pressure of 0.3 MPa (G) at a hot air temperature of 130° C., to obtain a dried fine powder.

This fine powder was observed by SEM, whereby tertiary agglomerated particles of silica were not substantially observed, and this fine powder was found to consist essentially of the secondary particles of foliar silica of the present invention, which were present discretely each other. According to observation by SEM, this secondary foliar silica particles had an average aspect ratio of about 40.

Example 1
(1) 2.76 kg of a slurry (pH: 8.5, average particle size by laser diffraction/scattering type particle size distribution measuring apparatus: 0.54 μm) of foliar silica secondary particles in a solid content concentration of 14 mass % which was obtained by Synthesis Example 5 and treated by a medium-stirring beads mill and 20.0 kg of a floor polishing liquid (tradename: COMFORT UHS, pH 8.5, solid content concentration 17.4 mass %, manufactured by J•S•P Co.) in aqueous emulsion state containing an acryl(methacrylate) resin component, a urethane resin component and a styrene resin component, were placed in a container equipped with a stirrer, and were fully stirred to obtain a floor polishing composition having foliar silica secondary particles blended therein. The composition thus obtained had a mass ratio of resin:silica content=90:10 in terms of solid content calculation and a pH of 8.5.

(2) A coating test was carried out on a floor of a passageway of a food sale floor in a large supermarket.

That is, after peeling, washing and drying a conventional polishing film, the above obtained polishing liquid having foliar silica blended therein was manually coated 4 times with a coating mop on a floor having polyvinyl chloride floor tiles (composition vinyl floor tile, tradename: VENES 50-311 (gray design on white base), manufactured by Achilles Co.) of 304.8 mm×304.8 mm×3.2 mm spread all over. After each coating, drying at room temperature was carried out for about 1 hour. A coated amount by one time was 2 to 3 g/m² in terms of solid content calculation.

After coating and drying, the coated film was subjected to mechanical polishing (buff polishing (burnishing)). The initial outer appearance of the coated film after polishing had a high glossiness, and the coated film was so transparent that the design of the tiles were satisfactorily visible.

(3) With regard to hardness of the above coated film, it was substantially impossible to accurately measure pencil hardness of the film coated on a vinyl chloride tile in accordance with pencil hardness test method (JIS K5400) because the tile as a substrate is soft and the tile surface has concavo-convex portions.

Accordingly, hardness of the coated film itself was measured accurately in a laboratory scale in the following manner.

By using a glass plate (soda lime glass of 70 mm×150 mm×2 mm) as a substrate, the polishing liquid was coated on the glass plate by a #80 bar coater (manufactured by Eto Kikai) in accordance with a bar coater coating method (JIS K5400) in a coated amount of 20 g/m² in terms of solid content calculation, and was dried at room temperature for 24 hours to prepare a test piece.

By using the test piece thus prepared, hardness of the coated film and adhesion of the coated film to the substrate were measured in accordance with cross cut peeling test and pencil hardness test disclosed in JIS K5400 paint test method (in the following Examples and Comparative Examples, the same test method was employed).

As this result, the pencil hardness was B, and the evaluation point of the cross cut peeling test was 10.

The tile having the coated film formed on the surface was cooled by liquid nitrogen and was cut, and the cut cross section was observed by SEM. The coated film comprising an organic high molecular material and foliar silica secondary particles was not penetrated into the tile inside, and it was confirmed that a homogeneous film having a satisfactory adhesion to the tile surface having fine concavo-convex portions could be formed and a satisfactory sealing effect was achieved.

A characteristic point was that according to observation of the cut cross section by SEM, a boundary between the base tile and the film containing foliar silica secondary particles formed on the tile surface was not clearly distinguishable. This means that the resin compound forming the tile and the resin compound forming the film were completely integrated in such a manner that its apparent boundary could not be recognized, and a homogeneous film hardly distinguishable from the base layer was formed. Thus, the floor polishing film of the present invention having foliar silica secondary particles blended therein provided a tough film integrated with the base plate having properties essentially different from the film properties, and provided greatly improved abrasion resistance and scratch resistance.

Also, the surface of the film formed on the tile surface was subjected to low temperature oxygen plasma ashing treatment at 100 W for 10 minutes to remove an organic high molecular material by ashing, and it was clearly observed by SEM that the foliar silica secondary particles are laminated and overlaid on the tile surface.

(4) On the floor having the film coated, many supermarket customers passed frequently everyday for 11 hours, and carts also passed frequently. After closing the store, a daily care operation (operation of washing the coated film with a dilute aqueous solution of a neutral detergent and drying at room temperature) only was carried out as a maintenance operation, and after 3 months, the state of the floor surface was visually observed with the naked eyes and glossiness was measured by a gloss meter.

After coating and drying, the coated film provided satisfactory antifouling properties such as heel mark resistance stably from the initial stage, and soils and dirty portions attached to the coated film could be easily removed by a mop in the daily care operation. Also, it was not recognized that the soils or dirty portions were accumulated as a lapse of time.

An valuation mark by the naked eye observation of the film on the floor surface after 3 months and a glossiness value measured by a portable gloss meter (PG-1M model, manufactured by Nippon Denshi Kogyo K.K.) (measurement angle 60°) are shown in the following Table 1.

Example 2

(1) 3.65 kg of a slurry (pH: 8.5, average particle size by laser diffraction/scattering type particle size distribution measuring apparatus: 0.54 $\mu$m) having a solid content concentration of 14 mass % obtained by the method disclosed in Synthesis Example 5 and treated by a medium stirring beads mill and 20.0 kg of a floor polishing liquid (tradename: PRIMODUAL, pH 8.46 and solid content concentration 23.0 mass %, manufactured by J•S•P Co.) in aqueous emulsion state containing an acryl(methacrylate) resin component and a styrene resin component, were fully stirred and mixed in a container equipped with a stirrer to prepare a floor polishing composition having foliar silica secondary particles blended therein. The composition thus prepared had a mass ratio of resin: silica content=90:10 in terms of solid content calculation and had a pH of 8.5.

(2) A coating test was carried out on a floor of a passageway of a toy sale floor in the same supermarket as in Example 1.

That is, after peeling a conventional polishing film, washing and drying, the above prepared polishing liquid containing foliar silica secondary particles were manually coated 4 times with a coating mop on a floor having polyvinyl chloride floor tiles (composition vinyl floor tile, tradename VENES 50-311 (gray designs on white base) manufactured by Achilles Co.) of 304.8 mm×304.8 mm×3.2 mm spread all over. After each coating, drying at room temperature for about 1 hour was carried out. A coated amount by each coating was 2 to 3 g/m$^2$ in terms of solid content calculation.

After coating and drying, the coated film was subjected to a mechanical polishing operation. After polishing, outer appearance of the coated film at the initial stage had a high glossiness, and the coated film was a transparent film, through which the designs on the tiles were satisfactorily visible.

(3) Hardness and adhesion of the coated film to a substrate were measured in accordance with the same pencil hardness test and cross cut peeling test as in Example 1, and the pencil hardness was H and the evaluation mark of the cross cut peeling test was 10.

Also, a tile having the film formed on the surface was cooled with liquid nitrogen and was cut, and the cut cross section was observed by SEM. As this result, it was confirmed that the film comprising an organic high molecular material and foliar silica secondary particles did not invade into the tile inside in the same manner as in Example 1, that the coated film had a satisfactory adhesion to the tile surface having fine concavo-convex portions and formed a film homogeneous with the base plate, and that a satisfactory sealing effect was achieved.

According to observation of the cut cross section by SEM, the coated film containing foliar silica secondary particles was hardly distinguishable from the base tile surface in the same manner as in the coated film of Example 1. That is, in this case, the coated film and the base tile were completely integrated so that its apparent boundary between the coated film and the base tile was hardly recognized, and it was confirmed that a homogeneous film hardly distinguishable from the base plate layer was formed.

Also, the film formed on the tile surface was subjected to low temperature oxygen plasma ashing treatment at 100 W for 10 minutes to remove the organic high molecular material by ashing, and the state of foliar silica secondary particles was observed by SEM, and it was clearly observed that the foliar silica secondary particles were laminated and overlaid on the tile surface.

(4) On the floor having the film coated, many customers of a supermarket were passed frequently everyday for 11 hours, and carts also passed frequently. After closing the store, a daily care operation (operation of washing the coated surface with a dilute aqueous solution of a neutral detergent and drying at room temperature) only was carried out as a maintenance operation, and after 3 months, the state of the floor surface was observed with the naked eyes and glossiness was measured by a gloss meter.

After coating and drying, the coated film provided antifouling properties such as heel mark resistance stably from the initial stage, and soils or dirty parts attached to the coated film could be easily removed with a mop in the daily care operation. Also, it was not recognized that soils or dirty portions were accumulated as a lapse of time.

An evaluation mark of the naked eye observation of the coated film on the floor surface and a glossiness value measured by a portable gloss meter (PG-1M mode manufactured by Nippon Denshoku Kogyo K.K.) (measurement angle 60°) after 3 months are shown in the following Table 1.

Example 3

(1) 23.2 kg of a slurry (pH: 8.5, average particle size by Coulter counter 1.6 $\mu$m) having a solid content concentration of 15 mass % obtained by the method disclosed in Synthesis Example 3 and treated by a medium-stirring beads mill and 20.0 kg of a floor polishing liquid (tradename: COMFORT UHS, solid content concentration 17.4 mass %, manufactured by J•S•P Co.) in aqueous emulsion state containing an acryl(methacrylate) resin component, a urethane resin component and a styrene resin component, were placed in a container equipped with a stirrer, and were fully stirred and mixed to prepare a floor polishing composition having foliar silica secondary particles blended therein. The composition thus prepared had a mass ratio of resin:silica content=50:50 in terms of solid content calculation and had a pH of 8.5.

(2) A coating test was carried out on a floor between register rows in the same supermarket as in Example 1.

That is, after peeling, washing and drying a conventional polishing film, the above prepared polishing liquid containing foliar silica was manually coated 4 times with a coating mop on a floor having polyvinyl chloride tiles (composition vinyl floor tile, tradename: VENES 50-311 (gray designs on white base), manufactured by Achilles Co.) of 304.8 mm×304.8 mm×3.2 mm spread all over. After each coating, drying at room temperature for about 1 hour was carried out. A coated amount by each coating was 2 to 3 g/m$^2$ in terms of solid content calculation.

(3) Hardness of the coated film and adhesion to a substrate were measured in accordance with the same pencil hardness test and cross cut peeling test as in Example 1, and the pencil hardness was F and the evaluation point of the cross cut peeling test was 10.

(4) Since glossiness and transparency of the above coated film containing foliar silica secondary particles were insufficient, a floor polishing liquid (tradename: COMFORT UHS, solid content concentration: 17.4 mass %, manufactured by J•S•P Co.) in aqueous emulsion state containing an acryl(methacrylate) resin component, a urethane resin component and a styrene resin component but not containing foliar silica was coated two times. After each coating, drying at room temperature was carried out for about 1 hour. A coated amount by each coating was 2 to 3 g/m$^2$ in terms of solid content calculation.

Further, after coating and drying, the coated film was subjected to a mechanical polishing operation. After polishing, outer appearance of the coated film had a satisfactory glossiness from the initial stage, and the coated film was a transparent film, through which the designs of the tiles were satisfactorily visible.

Also, a tile having the film formed on the surface was cooled with liquid nitrogen and was cut, and the cut cross section was observed by SEM. The coated film comprising an organic high molecular material and foliar silica secondary particles did not invade into the tile inside substantially in the same manner as in Example 1, and provided a satisfactory adhesion to the tile surface having fine concavo-convex portions, and formed a film homogeneous with the base substrate, and it was confirmed that a satisfactory sealing effect was achieved.

According to the observation of the cut cross section by SEM, in the same manner as in Example 1, the coated film and base tile were completely integrated so that its apparent boundary between the coated film and the base tile could not be recognized, and it was confirmed that a homogeneous film hardly distinguishable from the base layer was formed.

Further, the coated film formed on the tile surface was subjected to low temperature oxygen plasma ashing treatment at 100 W for 10 minutes to remove the organic high molecular material by ashing, and the state of the foliar silica secondary particles was observed by SEM, and it was clearly observed that the foliar silica secondary particles were laminated and overlaid on the tile surface.

(5) On the floor having the film coated, many customers of a supermarket passed frequently everyday for 11 hours, and carts also passed frequently. After closing the store, a daily care operation (operation of washing the coated surface with a dilute aqueous solution of a neutral detergent and drying at room temperature) only was carried out as a maintenance operation, and the state of the floor surface was observed with the naked eyes and glossiness was measured by a gloss meter after 3 months. The coated film provided antifouling properties such as heel mark resistance stably from the initial stage after coating and drying, and soils or dirty portions attached to the film could be easily removed by the daily care operation. Also, it was not recognized that the soils or the dirty portions were accumulated as a lapse of time.

An evaluation mark of the film on the floor surface by the naked eye observation made after a lapse of 3 months and a glossiness value measured by a portable gloss meter (PG-1M model manufactured by Nippon Denshoku Kogyo K.K.) (measurement angle 60°) are shown in the following Table 1.

Example 4

(1) 23.2 kg of a slurry (pH: 8.5, average particle size by Coulter counter 1.7 μm) having a solid content concentration of 15 mass % prepared by the method disclosed in Synthesis Example 4 and treated by a medium-stirring beads mill and 20.0 kg of a floor polishing liquid (tradename: COMFORT UHS, solid content concentration 17.4 mass %, manufactured by J•S•P Co.) in aqueous emulsion state containing an acryl(methacrylate) resin component, a urethane resin component and a styrene resin component were placed in a container equipped with a stirrer, and were fully stirred and mixed to prepare a floor polishing composition having foliar silica secondary particles blended therein. The composition thus obtained had a mass ratio of resin:silica content=50:50 in terms of solid content calculation and had a pH of 8.5.

(2) A coating test was carried out on a floor between registers in the same supermarket as in Example 3.

That is, after peeling, washing and drying a conventional polishing film, the above obtained polishing liquid containing foliar silica was manually coated 4 times with a coating mop on polyvinyl chloride floor tiles (composition vinyl floor tile, tradename: VENES 50-311 (gray designs on white base), manufactured by Achilles Co.) of 304.8 mm×304.8 mm×3.2 mm spread all over. After each coating, drying at room temperature was carried out for about 1 hour. A coated amount by each coating was 2 to 3 g/m$^2$ in terms of solid content calculation.

(3) Hardness of the coated film and adhesion to a substrate were measured in accordance with the same pencil hardness test and cross cut peeling test as in Example 1, and the pencil hardness was F and an evaluation point of the cross cut test was 10.

(4) Further, since glossiness and transparency of the above coated film containing foliar silica secondary particles only were insufficient, a floor polishing liquid (tradename: COMFORT UHS, solid content concentration: 17.4 mass %, manufactured by J•S•P Co.) in aqueous emulsion state containing an acryl(methacrylate) resin component, a urethane resin component and a styrene resin component but not containing foliar silica was coated two times on the above coated film. After each coating, drying at room temperature was carried out for about 1 hour. A coated amount by each coating was 2 to 3 g/m$^2$ in terms of solid content calculation.

Further, after coating and drying, the coated film was subjected to a mechanical polishing operation. After polishing, the initial outer appearance exhibited a high glossiness, and the coated film was a transparent film, through which the designs of the tiles were satisfactorily visible.

A tile having the film formed on the surface was cooled with liquid nitrogen and was cut, and the cut cross section was observed by SEM. The coated film comprising an organic high molecular material and foliar silica secondary particles did not invade into the tile inside in the same manner as in Example 1, and provided a satisfactory adhesion to the tile surface having fine concavo-convex portions, and formed a film homogeneous with the base substrate, and it was confirmed that a satisfactory sealing effect was achieved.

According to the SEM observation of the cut cross section, the coated film and the base tile were completely integrated in the same manner as in Example 1 so that its apparent boundary between the coated film and the base tile could not be recognized, and it was confirmed that a homogeneous film hardly distinguishable from the base layer was formed.

Further, the film formed on the tile surface was subjected to low temperature oxygen plasma ashing treatment at 100 W for 10 minutes to remove the organic high molecular material by ashing, and according to the observation by SEM, it was clearly observed that the state of the foliar silica secondary particles was laminated and overlaid on the tile surface.

(5) On the floor having the film coated, many supermarket customers passed frequently everyday for 11 hours, and carts also passed frequently. After closing the store, a daily care operation (operation of washing the coated surface with a dilute aqueous solution of a neutral detergent and drying at room temperature) only was carried out as a maintenance operation, and after 3 months, the state of the floor surface was observed with the naked eyes and glossiness was measured by a gloss meter.

The coated film provided antifouling properties such as heel mark resistance stably from the initial stage after coating and drying, and soils or dirty portions attached to the coated film could be easily removed by the daily care operation. Also, it was not recognized that the soils or the dirty portions were accumulated as a lapse of time.

An evaluation mark of the coated film on the floor surface by the naked eye observation made after a lapse of 3 months and a glossiness value measured by a portable gloss meter (PG-1M model manufactured by Nippon Denshoku Kogyo K.K.) (measurement angle 60°) are shown in the following Table 1.

Example 5

(1) 37.7 kg of a slurry (pH: 8.5, average particle size by laser diffraction/scattering type particle size distribution measuring apparatus 0.54 µm) having a solid content concentration obtained by the method disclosed in Synthesis Example 5 and treated by a medium stirring beads mill and 20.0 kg of a floor polishing liquid (tradename: ACHIEVE, pH 8.45, solid content concentration 17.6 mass %, manufactured by J•S•P Co.) in aqueous emulsion state containing an acryl (methacrylate) resin component and a styrene resin component were placed in a container equipped with a stirrer, and were fully stirred and mixed to obtain a floor polishing composition (hereinafter referred to as "A liquid") having foliar silica secondary particles blended therein. The composition thus obtained had a mass ratio of resin:silica content=40:60 in terms of solid content calculation, and had a pH of 8.5.

Further, 2.79 kg of a slurry (average particle size by laser diffraction/scattering type particle size distribution measuring apparatus 0.54 µm) having a solid content concentration of 14 mass % treated by the medium stirring beads mill disclosed in Synthesis Example 5 and 20.0 kg of a floor polishing liquid (ACHIEVE, solid content concentration 17.6 mass %, manufactured by J•S•P Co.) in aqueous emulsion state containing an acryl(methacrylate) resin component and a styrene resin component, were placed in a container equipped with a stirrer, and were fully stirred and mixed to obtain a floor polishing composition (hereinafter referred to as "B liquid") having foliar silica secondary particles blended therein. The composition thus obtained had a mass ratio of resin:silica content=90:10 in terms of solid content calculation.

(2) A coating test was carried out on a cart place floor in the same supermarket as in Example 1.

That is, after peeling, washing and drying a conventional polishing film, the above obtained polishing liquid (A liquid) containing foliar silica secondary particles was manually coated 2 times with a coating mop on a floor having polyvinyl chloride floor tiles (composition vinyl floor tile, tradename: VENES 50-311 (gray designs on white base), manufactured by Achilles Co.) of 304.8 mm×304.8 mm×3.2 mm spread all over. After each coating, drying at room temperature was carried out for about 1 hour. A coated amount by each coating was 2 to 3 g/m$^2$ in terms of solid content calculation.

(3) Hardness of the coated film and adhesion to a substrate were measured in accordance with the same pencil hardness test and cross cut peeling test as in Example 1, and the pencil hardness was 5H and an evaluation mark of the cross cut peeling test was 10.

(4) Further, the floor polishing liquid (B liquid) containing foliar silica secondary particles was manually coated 2 times with a coating mop on the above coated film of A liquid. After each coating, drying at room temperature was carried out for about 1 hour. A coated amount by each coating was 2 to 3 g/m$^2$ in terms of solid content calculation.

After coating and drying, a coated film was subjected to a mechanical polishing operation. After polishing, the initial outer appearance of the coated film had a satisfactory glossiness and the coated film was a film, through which the designs of the tiles were visible.

(5) Hardness of the coated film surface and adhesion of the film to a substrate were measured in accordance with the same pencil hardness test and cross cut peeling test as in Example 1, and the pencil hardness was H and an evaluation mark of the cross cut peeling test was 10.

Also, a tile having the film formed on the surface was cooled with liquid nitrogen and was cut, and the cut cross section was observed by SEM. The coated film comprising an organic high molecular material and foliar silica secondary particles did not invade into the tile inside in the same manner as in Example 1, and provided a satisfactory adhesion to the tile surface having fine concavo-convex portions and formed a film homogeneous with the base substrate, and it was confirmed that a satisfactory sealing effect was achieved.

According to the SEM observation of the cut cross section, the coated film and the base tile were completely integrated in the same manner as in Example 1 so that its apparent boundary between the coated film and the base tile could not be recognized, and it was confirmed that a homogeneous film hardly distinguishable from the base layer was formed.

Also, the coated surface formed on the tile surface was subjected to low temperature oxygen plasma ashing treatment at 100 W for 10 minutes to remove the organic high molecular material by ashing, and the state of the foliar silica secondary particles was observed by SEM, and it was clearly observed that the foliar silica secondary particles were laminated and overlaid on the tile surface.

(6) On the floor having the film coated, many supermarket customers took carts in and out everyday for 11 hours. After closing the store, a daily care operation (operation of washing the coated surface with a dilute aqueous solution of a neutral detergent and drying at room temperature) only was carried out as a maintenance operation, and after 3 months, the state of the floor surface was observed by the naked eyes and glossiness was measured by a gloss meter.

The coated film provided antifouling properties stably from the initial stage after coating and drying, and soils and dirty portions attached to the coated film could be easily removed by a mop in the daily care operation. A slight scratching damage was somewhat recognized, but much less as compared with the following Comparative Example 5.

An evaluation mark of the coated film on the floor surface by the naked eye observation made after a lapse of 3 months and a glossiness value measured by a portable gloss meter (PG-1M model manufactured by Nippon Denshoku Kogyo K.K.) (measurement angle 60°) are shown in the following Table 1.

Example 6

(1) 1.31 kg of a slurry (pH: 8.5, average particle size by laser diffraction/scattering type particle size distribution measuring apparatus 0.54 $\mu$m) having a solid content concentration of 14 mass % prepared by the method disclosed in Synthesis Example 5 and treated by a medium stirring beads mill and 20.0 kg of a floor polishing liquid (tradename: COMFORT UHS, solid content concentration 17.4 mass %, manufactured by J•S•P Co.) in aqueous emulsion state containing an acryl(methacrylate) resin component, a urethane resin component and a styrene resin component were placed in a container equipped with a stirrer, and were fully stirred and mixed to obtain a floor polishing composition. The composition thus obtained had a mass ratio of resin:silica content= 95:5 in terms of solid content calculation, and had a pH of 8.5.

(2) A coating test was carried out on a floor surface of a food sale floor passageway in the same supermarket as in Example 1.

That is, after peeling, washing and drying a conventional polishing film, the above obtained polishing liquid containing foliar silica secondary particles was manually coated 6 times with a coating mop on a floor having polyvinyl chloride floor tiles (composition vinyl floor tile, tradename: VENES 50-311 (gray designs on white base), manufactured by Achilles Co.) of 304.8 mm×304.8 mm×3.2 mm spread all over. After each coating, drying at room temperature was carried out for about 1 hour. A coated amount by each coating was 2 to 3 g/m$^2$ in terms of solid content calculation.

After coating and drying, the coated film was subjected to a mechanical polishing operation. After polishing, the initial outer appearance of the coated film had a high glossiness, and the coated film was a transparent film, through which the designs of the tiles were satisfactorily visible.

(3) Hardness of the coated film and adhesion to a substrate were measured in accordance with the same pencil hardness test and cross cut peeling test as in Example 1, and the pencil hardness was 2B and an evaluation mark of the cross cut peeling test was 10.

Also, a tile having the film formed on the surface was cooled with liquid nitrogen and cut, and the cut cross section was observed by SEM. It was confirmed that the coated film comprising an organic high molecular material and foliar silica secondary particles did not invade into the tile inside almost in the same manner as in Example 1, that the coated film provided a satisfactory adhesion to the tile surface having fine concavo-convex portions and formed a film homogeneous with the base substrate, and that a satisfactory peeling effect was achieved.

According to the SEM observation of the cut cross section, the coated film and the base tile were completely integrated in the same manner as in Example 1 so that its apparent boundary between the coated film and the base tile could not be recognized, and it was confirmed that a homogeneous film hardly distinguishable from the base layer was formed.

Also, the surface of the coated film formed on the tile surface was subjected to low temperature oxygen plasma ashing treatment at 100 W for 10 minutes to remove the organic high molecular material by ashing, and the state of foliar silica secondary particles was observed by SEM, and it was clearly observed that the foliar silica secondary particles were laminated and overlaid on the tile surface.

(4) On the floor having the film coated, many supermarket customers passed frequently everyday for 11 hours and carts also passed frequently. After closing the store, a daily care operation (operation of washing the coated surface with a dilute aqueous solution of a neutral detergent and drying at room temperature) only was carried out as a maintenance operation, and after 3 months, the state of the floor surface was observed by the naked eyes and glossiness was measured by a gloss meter.

The coated film provided antifouling properties such as heel mark resistance stably from the initial stage after coating and drying, and soils and dirty portions attached to the coated film could be easily removed by the daily care operation. It was not recognized that the soils or the dirty portions were accumulated as a lapse of time.

An evaluation mark of the coated film on the floor surface by the naked eye observation made after a lapse of 3 months and a glossiness value measured by a portable gloss meter (PG-1M model manufactured by Nippon Denshoku Kogyo K.K.) (measurement angle 60°) are shown in the following Table 1.

Example 7

(1) 0.18 kg of mica fine particles (synthetic mica, tradename PDM-9WA, average particle size by Coulter counter: 6.31 $\mu$m, aspect ratio: about 30, manufactured by Topy Kogyo K.K.) and 20.0 kg of a floor polishing liquid (tradename: COMFORT UHS, solid content concentration 17.4 mass %, manufactured by J•S•P Co.) in aqueous emulsion state containing an acryl(methacrylate) resin component, a urethane resin component and a styrene resin component, were placed in a container equipped with a stirrer, and were fully stirred and mixed to obtain a floor polishing composition. The composition thus obtained had a mass ratio of resin:mica=95:5 in terms of solid content calculation.

(2) A coating test was carried out on a floor surface of a food sale floor passageway in the same supermarket as in Example 1.

That is, after peeling, washing and drying a conventional polishing film, the above obtained polishing liquid containing mica was manually coated 6 times with a coating mop on a floor having polyvinyl chloride floor tiles (composition vinyl floor tile, tradename: VENES 50-311 (gray designs on white base), manufactured by Achilles Co.) of 304.8 mm×304.8 mm×3.2 mm spread all over. After each coating, drying at room temperature was carried out for about 1 hour. A coated amount by each coating was 2 to 3 g/m$^2$ in terms of solid content calculation.

After coating and drying, the coated film was subjected to a mechanical polishing operation. After polishing, the initial outer appearance of the coated film had a high glossiness, and the coated film was a transparent film, through which the designs of the tiles were satisfactorily visible.

(3) Hardness of the coated film and adhesion to a substrate were measured in accordance with the same pencil hardness test and cross cut peeling test as in Example 1, and the pencil hardness was 2B and an evaluation mark of the cross cut peeling test was 10.

(4) On the floor having the film coated, many supermarket customers passed frequently everyday for 11 hours, and carts also frequently passed. After closing the store, a daily care operation (operation of washing the coated surface with a dilute aqueous solution of a neutral detergent and drying at room temperature) only was carried out as a maintenance operation, and after 3 months, the state of the floor surface was observed by the naked eyes and glossiness was measured by a gloss meter.

An evaluation mark of the coated film on the floor surface by the naked eye observation made after a lapse of 3 months and a glossiness value measured by a portable gloss meter (PG-1M model manufactured by Nippon Denshoku Kogyo K.K.) (measurement angle 60°) are shown in the following Table 1.

Example 8

(1) 0.183 kg of fine particles of talc (tradename T-M70Y, average particle size by Coulter counter: 5.60 μm, aspect ratio: about 20, manufactured by Fukuoka Talc Kogyosho K.K.) and 20.0 kg of a floor polishing liquid (tradename: COMFORT UHS, solid content concentration 17.4 mass %, manufactured by J•S•P Co.) in aqueous emulsion state containing an acryl(methacrylate) resin component, a urethane resin component and a styrene resin component were placed in a container equipped with a stirrer, and were fully stirred and mixed to obtain a floor polishing composition. The composition thus obtained had a mass ratio of resin:talc=95:5 in terms of solid content calculation.

(2) A coating test was carried out on a floor of a food sale floor passageway in the same supermarket as in Example 1.

That is, after peeling, washing and drying a conventional polishing film, the above obtained polishing liquid containing talc was manually coated 6 times with a coating mop on a floor having polyvinyl chloride floor tiles (composition vinyl floor tile, tradename: VENES 50-311 (gray designs on white base), manufactured by Achilles Co.) of 304.8 mm×304.8 mm×3.2 mm spread all over. After each coating, drying at room temperature was carried out for about 1 hour. A coated amount by each coating was 2 to 3 g/m² in terms of solid content calculation.

After coating and drying, the coated film was subjected to a mechanical polishing operation. After polishing, the initial outer appearance of the coated film had a high glossiness, and the coated film was a transparent film, through which the designs of the tiles were satisfactorily visible.

(3) Hardness of the coated film and adhesion to a substrate were measured in accordance with the same pencil hardness test and cross cut peeling test as in Example 1, and the pencil hardness was 2B and an evaluation mark of the cross cut peeling test was 10.

(4) On the floor having the film coated, many supermarket customers passed frequently everyday for 11 hours, and carts also passed frequently. After closing the store, a daily care operation (operation of washing the coated surface with a dilute aqueous solution of a neutral detergent and drying at room temperature) only was carried out as a maintenance operation, and after 3 months, the state of the floor surface was observed by the naked eyes and glossiness was measured by a gloss meter.

An evaluation mark of the coated film on the floor surface by the naked eye observation made after a lapse of 3 months and a glossiness value measured by a portable gloss meter (PG-1M model manufactured by Nippon Denshoku Kogyo K.K.) (measurement angle 60°) are shown in the following Table 1.

Comparative Example 1

(1) A floor polishing liquid (tradename: COMFORT UHS, solid content concentration 17.4 mass %, manufactured by J•S•P Co.) in aqueous emulsion state containing an acryl(methacrylate) resin component, a urethane resin component and a styrene resin component but not containing foliar silica secondary particles was coated 4 times on a floor of the same food sale floor passageway as in Example 1. After each coating, drying was carried out at room temperature for about 1 hour. A coated amount by each coating was 2 to 3 g/m² in terms of the same solid content calculation as in Example 1.

After coating and drying, the coated film was subjected to a mechanical polishing operation. After polishing, the initial outer appearance of the coated film had a high glossiness, and the coated film was a transparent film, through which the designs of the tiles were satisfactorily visible.

(2) Hardness of the coated film and adhesion to a substrate were measured in accordance with the same pencil hardness test and cross cut peeling test as in Example 1, and the pencil hardness was 2B, and an evaluation mark by the cross cut peeling test was 10.

Also, a tile having the film formed on the surface was cooled with liquid nitrogen and was cut, and a cut cross section was observed by SEM. The organic high molecular material invaded to a depth of several tens μm from the tile surface into the inside, and integration of the coated film and the tile surface having fine concavo-convex portions could not be recognized at the boundary between the two, and it was confirmed that a sealing effect was not substantially achieved.

Thus, in the case of the coated film containing no filler, as could be observed by SEM, the coated film was a heterogeneous film clearly distinguishable from the base layer and did not integrate with the base tile at the boundary, and it is expected as a matter of fact that the coated film provides a low adhesion to the base tile and abrasion resistance and scratch resistance are low. Also, in the case of a coated film having colloidal silica blended as a filler, it was recognized that the coated film was a heterogeneous film clearly distinguishable from the base layer in the same manner as above.

(3) On the floor having the film coated, many supermarket customers passed frequently everyday for 11 hours, and carts also passed frequently. After closing the store, a daily care operation (operation of washing the coated surface with a dilute aqueous solution of a neutral detergent and drying at room temperature) only was carried out as a maintenance operation, and after 3 months, the state of the floor surface was observed by the naked eyes and glossiness was measured by a gloss meter.

The coated film did not provide satisfactory antifouling properties such as heel mark resistance at the time immediately after coating and drying, and the antifouling properties were improved as a lapse of time, but it took about 2 weeks until the properties were fully stabilized. In the daily care operation, it was clearly recognized that soils or dirty portions attached to the coated film which could not be easily removed by a mop were accumulated as a lapse of time. Also, scratches or damages on the coated film surface were striking.

An evaluation mark of the coated film on the floor surface by the naked eye observation made after a lapse of 3 months and a glossiness value measured by a portable gloss meter (PG-1M model manufactured by Nippon Denshoku Kogyo K.K.) (measurement angle 60°) are shown in the following Table 1.

Comparative Example 2

(1) A floor polishing liquid (tradename: PURIMODUAL, solid content concentration 23.0 mass %, manufactured by J•S•P Co.) in aqueous emulsion state containing an acryl (methacrylate) resin component and a styrene resin component but not containing foliar silica secondary particles was coated 4 times on a floor of the same toy sale floor passageway as in Example 2. After each coating, drying was carried out at room temperature for about 1 hour. A coated amount by each coating was 2 to 3 g/m$^2$ in terms of the same solid content calculation as in Example 2.

After coating and drying, the coated film was subjected to a mechanical polishing operation. After polishing, the initial outer appearance of the coated film had a high glossiness, and the coated film was a transparent film, through which the designs of the tiles were satisfactorily visible.

(2) Hardness of the coated film and adhesion to a substrate were measured in accordance with the same pencil hardness test and cross cut peeling test as in Example 1, and the pencil hardness was B, and an evaluation mark by the cross cut peeling test was 10.

(3) On the floor having the film coated, many supermarket customers passed frequently everyday for 11 hours, and many carts passed frequently. After closing the store, a daily care operation (operation of washing the coated surface with a dilute aqueous solution of a neutral detergent and drying at room temperature) only was carried out as a maintenance operation, and after 3 months, the state of the floor surface was observed by the naked eyes and glossiness was measured by a gloss meter.

The coated film provided poor antifouling properties such as heel mark resistance at the time immediately after coating and drying, and the antifouling properties were improved as a lapse of time, but it took about 2 weeks until the properties were fully stabilized.

In the daily care operation, it was clearly recognized that soils or dirty portions attached to the coated film which could not be easily removed by a mop were accumulated as a lapse of time. Also, scratches or damages on the coated film surface were striking.

An evaluation mark of the coated film on the floor surface by the naked eye observation made after a lapse of time and a glossiness value measured by a portable gloss meter (PG-1M model manufactured by Nippon Denshoku Kogyo K.K.) (measurement angle 60°) are shown in the following Table 1.

Comparative Example 3

(1) A floor polishing liquid (tradename: COMFORT UHS, solid content concentration 17.4 mass %, manufactured by J•S•P Co.) in aqueous emulsion state containing an acryl (methacrylate) resin component, a urethane resin component and a styrene resin component but not containing foliar silica secondary particles was coated 6 times on the same floor surface between registers in register rows adjacent to each other in the same manner as in Example 3. After each coating, drying at room temperature was carried out for about 1 hour. A coated amount by each coating was 2 to 3 g/m$^2$ in terms of the same solid content calculation as in Example 3.

After coating and drying, the coated film was subjected to a mechanical polishing operation. After polishing, the initial outer appearance of the coated film had a high glossiness, and the coated film was a transparent film, through which the designs of the tiles were satisfactorily visible.

(2) Hardness of the coated film and adhesion to a substrate were measured in accordance with the same pencil hardness test and cross cut peeling test as in Example 1, and the pencil hardness was 2B, and an evaluation mark of the cross cut peeling test was 10.

(3) On the floor having the film coated, many supermarket customers passed frequently everyday for 11 hours, and carts also passed frequently. After closing the store, a daily care operation (operation of washing the coated surface with a dilute aqueous solution of a neutral detergent and drying at room temperature) only was carried out as a maintenance operation, and after 3 months, the state of the floor surface was observed by the naked eyes and glossiness was measured by a gloss meter.

The coated film provided poor antifouling properties such as heel mark resistance at the time immediately after coating and drying, and the antifouling properties were improved as a lapse of time, but it took about 2 weeks until the properties were stabilized.

In the daily care operation, it was clearly recognized that soils or dirty portions attached to the coated film which could not be easily removed by a mop were accumulated as a lapse of time. An evaluation mark of the coated film on the floor surface by the naked eye observation made after a lapse of 3 months and a glossiness value measured by a portable gloss meter (PG-1M model manufactured by Nippon Denshoku Kogyo K.K.) (measurement angle 60°) are shown in the following Table 1.

Comparative Example 4

(1) A floor polishing liquid (tradename: COMFORT UHS, solid content concentration 17.4 mass %, manufactured by J•S•P Co.) in aqueous emulsion state containing an acryl (methacrylate) resin component, a urethane resin component and a styrene resin component and not containing foliar silica secondary particles was coated 6 times on a floor surface between registers in register rows adjacent to each other in the same manner as in Example 4. After each coating, drying at room temperature was carried out for about 1 hour. A coated amount by each coating was 2 to 3 g/m$^2$ in terms of the same solid content calculation as in Example 4.

After coating and drying, the coated film was subjected to a mechanical polishing operation. After polishing, the initial outer appearance of the coated film had a high glossiness, and the coated film was a transparent film, through which the designs of the tiles were clearly visible.

(2) Hardness of the coated film and adhesion to a substrate were measured in accordance with the same pencil hardness test and cross cut peeling test as in Example 1, and the pencil hardness was 2B, and an evaluation mark of the cross cut peeling test was 10.

(3) On the floor having the film coated, many supermarket customers passed frequently everyday for 11 hours, and carts also passed frequently. After closing the store, a daily care operation (operation of washing the coated surface with a dilute aqueous solution of a neutral detergent and drying at room temperature) only was carried out as a maintenance operation, and after 3 months, the state of the floor surface was observed by the naked eyes and glossiness was measured by a gloss meter.

The coated film provided poor antifouling properties such as heel mark resistance at the time immediately after coating and drying, and the antifouling properties were improved as a lapse of time, but it took about 2 weeks until the properties were stabilized.

In the daily care operation, it was clearly recognized that soils or dirty portions attached to the coated film which could not be easily removed by a mop were accumulated as a lapse of time.

After a lapse of 3 months, the coated film on the floor surface was evaluated by the naked eyes and a glossiness value (measurement angle 60°) was measured by a portable gloss meter (PG-1M model manufactured by Nippon Denshoku Kogyo K.K.) and the results are shown in the following Table 1.

Comparative Example 5

(1) A floor polishing liquid (ACHIEVE, solid content concentration 17.6 mass %, manufactured by J•S•P Co.) in aqueous emulsion state containing an acryl(methacrylate) resin component and a styrene resin component but not containing foliar silica secondary particles was coated 4 times on a floor of the same cart place as in Example 5. After each coating, drying at room temperature was carried out for about 1 hour. A coated amount by each coating was 2 to 3 g/m² in terms of the same solid content calculation as in Example 5.

After coating and drying, the coated film was subjected to a mechanical polishing operation. After polishing, the initial outer appearance of the coated film had a high glossiness, and the coated film was a transparent film, through which the designs of the tiles were clearly visible.

(2) Hardness of the coated film and adhesion to a substrate were measured in accordance with the same pencil hardness test and cross cut peeling test as in Example 1, and the pencil hardness was HB, and an evaluation mark of the cross cut peeling test was 10.

(3) On the floor having the film coated, many supermarket customers took carts in and out everyday for 11 hours. After closing the store, a daily care operation (operation of washing the coated film surface with a dilute aqueous solution of a neutral detergent and drying at room temperature) only was carried out as a maintenance operation, and after 1 month, the state of the floor surface was observed by the naked eyes and glossiness was measured by a gloss meter.

The coated film provided poor antifouling properties such as heel mark resistance at the time immediately after coating and drying, and the antifouling properties were improved as a lapse of time, but it took about 2 weeks until the properties were fully stabilized.

In the daily care operation, it was recognized that soils or dirty portions attached to the coated film which could not be easily removed by a mop were remarkably accumulated as a lapse of time. Also, scratches or damages on the coated film were remarkably increased, and it was clearly recognized that the coated film was peeled.

After a lapse of 3 months, the coated film on the floor surface was observed by the naked eyes and a glossiness value (measurement angle 60°) was measured by a portable gloss meter (PG-1M model manufactured by Nippon Denshoku Kogyo K.K.) and the results are shown in the following Table 1.

Comparative Example 6

(1) A floor polishing liquid (tradename: COMFORT UHS, solid content concentration 17.4 mass %, manufactured by J•S•P Co.) in aqueous emulsion state containing an acryl (methacrylate) resin component, a urethane resin component and a styrene resin component but not containing foliar silica secondary particles was coated 6 times on a floor of the same food sale floor passageway as in Example 6. After each coating, drying at room temperature was carried out for about 1 hour. A coated amount by each coating was 2 to 3 g/m² in terms of the same solid content calculation as in Example 6.

After coating and drying, the coated film was subjected to a mechanical polishing operation. After polishing, the initial outer appearance of the coated film had a high glossiness, and the coated film was a transparent film, through which the designs of the tiles were clearly visible.

(2) Hardness of the coated film and adhesion to a substrate were measured in accordance with the same pencil hardness test and cross cut peeling test as in Example 1, and the pencil hardness was 2B, and an evaluation mark of the cross cut peeling test was 10.

(3) On the floor having the film coated, many supermarket customers passed frequently everyday for 11 hours, and carts also passed frequently. After closing the store, a daily care operation (operation of washing the coated surface with a dilute aqueous solution of a neutral detergent and drying at room temperature) only was carried out as a maintenance operation, and after 3 months, the state of the floor surface was observed by the naked eyes and glossiness was measured by a gloss meter.

The coated film provided poor antifouling properties such as heel mark resistance at the time immediately after coating and drying, and the antifouling properties were improved as a lapse of time, and it took about 2 weeks until the properties were fully stabilized.

In the daily care operation, it was clearly recognized that soils or dirty portions attached to the coated film which could not be easily removed by a mop were accumulated as a lapse of time. Also, scratches or damages on the coated film surface were striking.

After a lapse of 3 months, the coated film on the floor surface was observed by the naked eyes and a glossiness value (measurement angle 60°) was measured by a portable gloss meter (PG-1M model manufactured by Nippon Denshoku Kogyo K.K.), and the results are shown in the following Table 1.

TABLE 1

|  | Evaluation mark by naked eye observation | Glossiness value by gloss meter |
|---|---|---|
| Example 1 | 1 | 62 |
| Comparative Example 1 | 3 | 50 |
| Example 2 | 1 | 67 |
| Comparative Example 2 | 3 | 48 |
| Example 3 | 1 | 51 |
| Comparative Example 3 | 3 | 35 |
| Example 4 | 1 | 48 |
| Comparative Example 4 | 3 | 37 |
| Example 5 | 2 | 33 |
| Comparative Example 5 | 4 | 10 |
| Example 6 | 1 | 70 |
| Example 7 | 2 | 51 |
| Example 8 | 2 | 49 |
| Comparative Example 6 | 3 | 45 |

Note:
In the above Table, evaluation of a coated film on a floor surface by naked eye observation after a lapse of 3 months was made by 4 ranks in accordance with the following standards.
Rank 1:
A coated film has a very high glossiness and no damage is substantially recognized on the coated film. Also, no dirty black portion was recognized on the coated film.
Rank 2:

TABLE 1-continued

| Evaluation mark by naked eye observation | Glossiness value by gloss meter |
|---|---|

A coated film has a high glossiness, but a damage was slightly recognized on the coated film. Also, a dirty black portion was slightly recognized on the coated film.
Rank 3:
A coated film has a low glossiness, and a damage was recognized on the coated film. Also, a dirty black portion was recognized on the coated film.
Rank 4:
A coated film has no glossiness, and a damage was remarkably recognized on the coated film. Also, a dirty black portion was remarkably recognized on the coated film.

The present inventors having a long working carrier in the floor polishing technical field have analyzed and studied the above data obtained after a lapse of 3 months on the basis of technical knowledges and many spot data in this field accumulated from daily maintenance operations and total repair operations for a long time, and it has been confirmed that the floor polishing composition of the present invention can largely prolong a term until the total repair.

When treating a substrate surface such as a floor surface with the floor polishing composition of the present invention, the floor polishing coating film provides greatly improved hardness, abrasion resistance, scratch resistance, antifouling properties and the like, and the properties of the coating film itself are improved and consequently maintenance operations of the coating film are largely reduced.

The entire disclosures of Japanese Patent Application No. 2000-256775 filed on Aug. 28, 2000 and Japanese Patent Application No. 2000-262611 filed on Aug. 31, 2000 including specifications, claims and summaries are incorporated herein by reference in their entireties.

What is claimed is:

1. A floor polishing composition, comprising:
    a film-formable organic resin material as the main component, and
    scaly particles,
    wherein said scaly particles are silica corresponding to layered polysilicic acid,
    wherein said layered polysilicic acid has layered particle structures that present independently from each other,
    wherein said layered polysilicic acid comprises foliar silica secondary particles that are present discretely from each other,
    wherein a plurality of flaky primary particles of scaly silica are overlaid one on another and aligned face-to-face in parallel with one another, and
    wherein the foliar silica secondary particles are obtained by disintegrating an aqueous slurry of tertiary agglomerated particles of silica by means of a mechanical high speed stirring system employing a disintegrating medium.

2. The floor polishing composition according to claim 1, wherein the foliar silica secondary particles composing the scaly silica are silica having the main peaks corresponding to silica-X and/or silica-Y according to X-ray diffraction analysis.

3. The floor polishing composition according to claim 1, wherein the organic resin material in the floor polishing composition is an organic resin material in aqueous emulsion state.

4. The floor polishing composition according to claim 2, wherein the organic resin material in the floor polishing composition is an organic resin material in aqueous emulsion state.

5. A floor polishing film, comprising:
    a film-formable organic resin material provided on a surface of a substrate, which resin material contains scaly particles;
    wherein said scaly particles are silica corresponding to layered polysilicic acid,
    wherein said layered polysilicic acid has layered particle structures that are present independently from each other,
    wherein said layered polysilicic acid comprises foliar silica secondary particles that are present discretely from each other,
    wherein a plurality of flaky primary particles of scaly silica are overlaid one on another and aligned face-to-face in parallel with one another.

6. The floor polishing film according to claim 5, wherein the foliar silica secondary particles composing scaly silica in the film are silica having the main peaks corresponding to silica-X and/or silica-Y according to x-ray diffraction analysis.

7. A floor polishing film according to claim 5, wherein an overcoating layer comprising an organic resin material is provided on the floor polishing film.

8. A floor polishing film according to claim 6, wherein an overcoating layer comprising an organic resin material is provided on the floor polishing film.

9. A method of treating a floor, comprising:
    applying a floor polishing film according to claim 5 to the floor.

10. A method of treating a floor comprising applying the floor polishing composition of claim 1 to the floor.

11. A method of treating a floor comprising applying the floor polishing composition of claim 2 to the floor.

12. A method of treating a floor comprising applying the floor polishing composition of claim 3 to the floor.

13. A method of treating a floor comprising applying the floor polishing composition of claim 4 to the floor.

14. A floor polishing film according to claim 5,
    wherein the foliar silica secondary particles are obtained by disintegrating an aqueous slurry of tertiary agglomerated particles of silica by means of a mechanical high speed stirring system employing a disintegrating medium.

15. The floor polishing film according to claim 14, wherein the foliar silica secondary particles composing scaly silica in the film are silica having the main peaks corresponding to silica-X and/or silica-Y according to x-ray diffraction analysis.

16. A floor polishing film according to claim 14, wherein an overcoating layer comprising an organic resin material is provided on the floor polishing film.

17. A floor polishing film according to claim 15, wherein an overcoating layer comprising an organic resin material is provided on the floor polishing film.

* * * * *